(12) United States Patent
Miller

(10) Patent No.: US 7,972,517 B1
(45) Date of Patent: Jul. 5, 2011

(54) METHOD FOR TREATMENT OF AGRICULTURAL WASTE

(75) Inventor: Francis C. Miller, Livonia, NY (US)

(73) Assignee: Innovative environmental Products, Inc., Livonia, NY (US)

( * ) Notice: Subject to any disclaimer, the term of this patent is extended or adjusted under 35 U.S.C. 154(b) by 419 days.

(21) Appl. No.: 12/035,492

(22) Filed: Feb. 22, 2008

Related U.S. Application Data

(60) Provisional application No. 60/891,505, filed on Feb. 24, 2007.

(51) Int. Cl.
C02F 1/56 (2006.01)
C02F 11/14 (2006.01)

(52) U.S. Cl. ............ 210/710; 71/21; 210/727; 210/780; 210/903; 210/906

(58) Field of Classification Search ............ 210/727
See application file for complete search history.

(56) References Cited

U.S. PATENT DOCUMENTS

| | | | |
|---|---|---|---|
| 4,582,627 A | 4/1986 | Carlsson | |
| 4,724,085 A | 2/1988 | Pohoreski | |
| 4,849,128 A | 7/1989 | Timmons et al. | |
| 4,871,454 A | 10/1989 | Lott | |
| 4,882,069 A | 11/1989 | Pohoreski | |
| 4,961,862 A * | 10/1990 | Janecek | 210/778 |
| 5,006,639 A | 4/1991 | Tono et al. | |
| 5,071,566 A | 12/1991 | Papp et al. | |
| 5,308,499 A | 5/1994 | Dixon et al. | |
| 5,531,907 A | 7/1996 | Williams et al. | |
| 5,587,086 A | 12/1996 | Danda et al. | |
| 5,595,654 A | 1/1997 | Caughman, Jr. | |
| 5,614,092 A | 3/1997 | Di Leo | |
| 5,914,040 A | 6/1999 | Pescher et al. | |
| 5,945,332 A * | 8/1999 | Fors | 435/262 |
| 6,036,935 A | 3/2000 | Dulko | |
| 6,110,374 A | 8/2000 | Hughes | |
| 6,190,569 B1 | 2/2001 | Parker | |
| 6,245,121 B1 | 6/2001 | Lamy et al. | |
| 6,365,052 B1 * | 4/2002 | Sivakumar et al. | 210/728 |
| 6,699,389 B1 | 3/2004 | Jochle et al. | |

(Continued)

OTHER PUBLICATIONS

Printed PDF version of Idee & Prodotti corporation web page with product information on the "Squeeze Box" filter at http://www.ideeeprodotti.com/eng/p_squeeze.htm. Exact Internet publication date unknown; approximately Sep. 2006 or earlier.

(Continued)

*Primary Examiner* — Peter A Hruskoci

(74) *Attorney, Agent, or Firm* — John M. Hammond; Patent Innovations LLC

(57) ABSTRACT

A method for treating a portion of liquid waste manure comprising adding a first reagent to the portion in a first vessel to cause the formation of waste manure flocs of a first size; adding a second reagent to liquid portion to cause growth of the waste manure flocs of the first size into separable waste manure flocs; adding optionally a third reagent to the portion of liquid containing waste manure flocs to cause further growth of the separable waste manure flocs; separating the liquid volume containing separable waste manure flocs into a waste manure sludge and a first filtrate; and dewatering the waste manure sludge in a filtration system comprising a first filter including a first housing, a first displaceable filter medium, and a first displacement actuator disposed between the first housing and the first displaceable filter medium.

26 Claims, 9 Drawing Sheets

U.S. PATENT DOCUMENTS

| | | | |
|---|---|---|---|
| 6,916,426 | B2 | 7/2005 | Van Slyke et al. |
| 6,926,832 | B2 | 8/2005 | Collins et al. |
| 7,112,283 | B2 | 9/2006 | Stephens |
| 7,371,328 | B1 * | 5/2008 | Hokanson et al. ............ 210/710 |
| 7,410,589 | B2 * | 8/2008 | Lakshman ................... 210/718 |
| 7,468,137 | B2 * | 12/2008 | Kojima et al. ................ 210/705 |
| 2002/0030012 | A1 | 3/2002 | Sullivan et al. |
| 2002/0074295 | A1 | 6/2002 | Cohen et al. |
| 2003/0057160 | A1 | 3/2003 | Williams et al. |
| 2004/0124154 | A1 | 7/2004 | Weir et al. |
| 2004/0226895 | A1 | 11/2004 | Bromley |
| 2005/0061750 | A1 | 3/2005 | Fabri et al. |
| 2005/0205496 | A1 | 9/2005 | Pullman et al. |
| 2005/0279710 | A1 | 12/2005 | Clemons, Sr. |
| 2006/0065595 | A1 | 3/2006 | Menke et al. |
| 2006/0108291 | A1 | 5/2006 | Lakshman |
| 2006/0138054 | A1 | 6/2006 | Menke et al. |
| 2006/0196834 | A1 | 9/2006 | Nichols et al. |

OTHER PUBLICATIONS

Printed PDF version of Idee & Prodotti corporation web page with product information on the "Dry Box 200" filter at http://www.ideeeprodotti.com/eng/p_drybox200.htm. Exact Internet publication date unknown; approximately Sep. 2006 or earlier.

Printed PDF version of Idee & Prodotti corporation web page with product information on the "Dry Box 15000" filter at http://www.ideeeprodotti.com/eng/p_drybox.htm. Exact Internet publication date unknown; approximately Sep. 2006 or earlier.

Printed PDF version of Flo Trend Systems Inc. web page with product information on the "Sludge Mate" filter at http://www.flotrend.com/sludgemate.html. Exact Internet publication date unknown; approximately Sep. 2006 or earlier.

Printed PDF of the Filing Receipt, specification, and drawings of the applicant Francis C. Miller's co-pending and commonly owned U.S. Appl. No. 11/968,240, Method and Apparatus for Treatment of Latex Waste, filed Jan. 2, 2008.

Printed PDF of Internet information of/by Dr. Dave Palmer on Cow Power Inc.; and relationship with applicant Francis C. Miller of Jannanco LLC; and Jannanco system. See pp. 1-3 and 8-11. Document dates circa May 2005, exact dates unknown.

Printed PDF of grant proposal application by the Applicant Francis C. Miller of Jannanco LLC to the New York State Energy Research and Development Authority (NYSERDA) for a grant to fund research and development grant for funding to develop an agricultural waste treatment process. Dated May 2003.

* cited by examiner

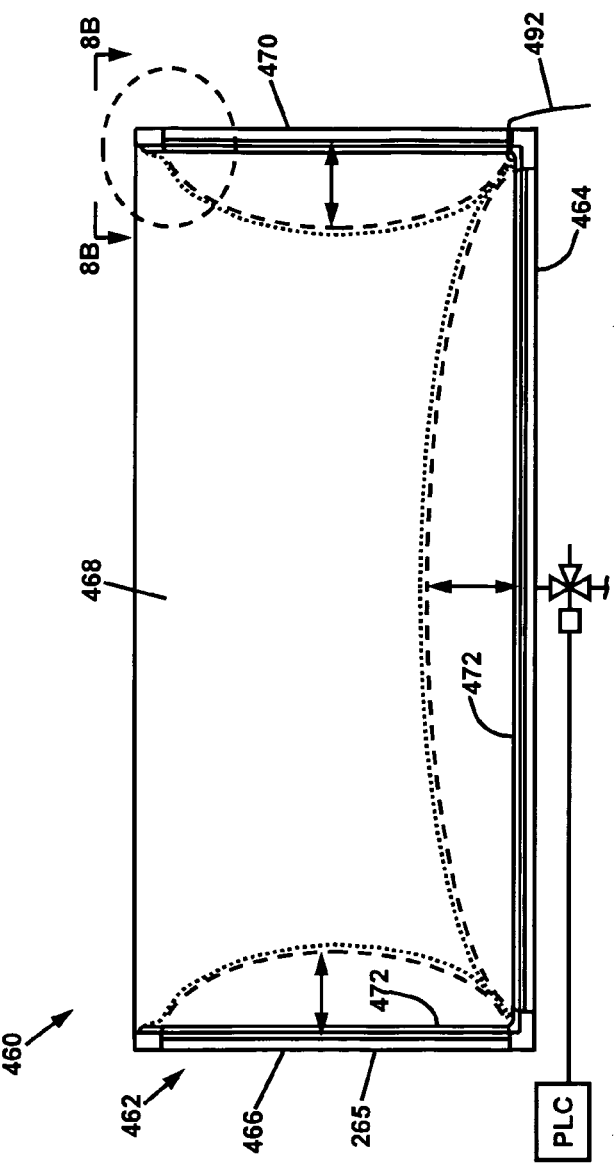
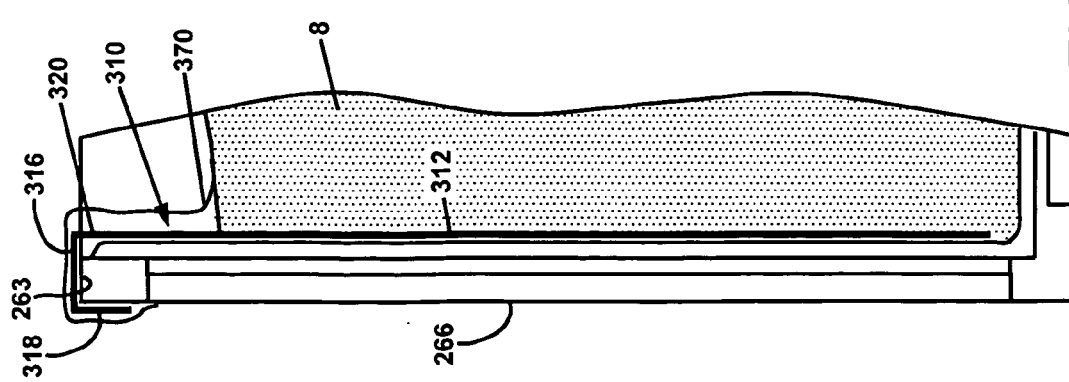
FIG. 8A
FIG. 7B

METHOD FOR TREATMENT OF AGRICULTURAL WASTE

This invention relates in one embodiment to a method for treatment of animal manure, and more particularly to the treatment of bovine manure in dairy operations in an environmentally acceptable manner.

CROSS-REFERENCE TO RELATED PATENT APPLICATIONS

This application claims priority from the applicant's U.S. provisional patent application Ser. No. 60/891,505 filed Feb. 24, 2007. The disclosure of this provisional patent application is incorporated herein by reference.

BACKGROUND OF THE INVENTION

1. Field of the Invention

Processes and apparatus for treatment of animal manure in agricultural applications.

2. Description of Related Art

The cleanup and handling of dairy cattle, beef cattle, swine, and poultry manure has become a crucial issue in the management of watersheds throughout the United States. There has been increasing publicity and stricter environmental requirements and enforcement regarding this issue, exemplified by the continuing concern over the battle to maintain water quality in areas such as the Chesapeake Bay, New York watersheds, and now sections of the Gulf or Mexico. Major catastrophic releases of manure as well as perpetual normal operational discharges of manure into sensitive watersheds have raised awareness of this issue by the general public.

Processes and chemical treatment regimens for the treatment of animal waste streams are known. For example, U.S. Pat. No. 6,245,121 of Lamy et al., the disclosure of which is incorporated herein by reference, describes a process for the treatment of aqueous effluents containing organic and inorganic matter and having a solids content of at most 12% by weight to provide a purified liquid phase and a solid organic fertilizer or organic soil improver. The process includes subjecting the effluent to one or more primary liquid/solid separation steps to obtain a liquid medium containing no more than 3% by weight of dry matter and having a turbidity of at most 300 NTU and a collection of concentrates containing in total 15% by weight dry matter. The liquid medium is subjected to ultra filtration or micro filtration to obtain an ultra filtrate or a micro filtrate containing at most 1% by weight dry matter and having a turbidity of at most 100 NTU. The ultra filtrate or micro filtrate is subjected to a reverse osmosis operation to obtain a concentrate and a permeate. The permeate constitutes a purified aqueous phase.

United States Patent Application Publication No. US 2003/0057160 of Williams et al., the disclosure of which is incorporated herein by reference, describes an animal waste treatment method comprising flushing animal waste from a barn to a holding tank where the waste is mixed with an alkaline solution to kill pathogens. After neutralization, the solution is separated into solids and liquids. The liquid is treated and recycled as flushing water to dean the barns and/or drinking water for the animals. The solids are separated into digested and undigested feed. The digested feed is further processed for use as a fertilizer and the undigested feed is processed for use as animal feed.

United States Patent Application Publication No. US 2005/0205496 of Pullman et al., the disclosure of which is incorporated herein by reference, discloses a process for treating liquid waste material comprising first adding a chemical flocculent to the liquid waste material followed by mixing to promote flocculation. The floc material is subsequently separated to produce a bulk clarified liquid, with the floc material being subjected to a solids separation to extract further bulk clarified liquid. The collected bulk clarified liquid is then recycled back into at least one of the steps of adding a chemical flocculent and solids separation of the floc material.

Dairy cattle, beef cattle, swine, poultry and other confined animal feeding operations (CAFO's) require significant capital and operating costs for transportation and/or handling, separation and spreading of manure. Current technologies for solids and nutrient separation have inherent limitations, are costly to operate, and result in the use of large quantities of fuel and labor in order to provide solid effluents that can either be recycled or are environmentally acceptable to spread on farmlands, and water-based effluents that are either useful in irrigation, in livestock operations, or as potable water, or are environmentally acceptable to spread on farmlands.

What is needed is a process for treating animal waste that is low in capital equipment cost, low in waste transportation cost, simple to operate, and that provides solid and liquid effluents with the above attributes.

SUMMARY OF THE INVENTION

To meet this need, the applicant has invented a process to clarify the liquid portions of manure and isolate problematic nutrients, and in some cases render them inert, in dewatered manure solids. Such problematic nutrients have contributed to the contamination of the watersheds mentioned above. The applicant's process cleans such waste streams beyond the capability of any existing commercially feasible competing technology. The applicant's process further results in energy cost reduction for spreading high-solids manure slurries, and isolation of problematic nutrients and sediments, which allows flexibility in manure management and spreading.

In accordance with the present invention, there is provided a method and an apparatus for treating a liquid or semi-solid portion of animal waste manure. The method comprises adding a first reagent to the portion in a first vessel to cause the formation of waste manure flocs of a first size; adding a second reagent to the liquid portion to cause growth of the waste manure flocs of the first size into separable waste manure flocs; adding optionally a third reagent to the liquid portion of liquid containing waste manure flocs to cause further growth of the separable waste manure flocs; separating the liquid volume containing separable waste manure flocs into a waste manure sludge and a first filtrate; and dewatering the waste manure sludge in a filtration system comprising a first filter including a first housing, a first displaceable filter medium, and a first displacement actuator disposed between the first housing and the first displaceable filter medium.

The first reagent is preferably ferric chloride, and the second reagent preferably includes a cationic polymer. The third reagent may include an anionic polymer In one embodiment of the process, bulking agents may be added if required to enhance the formation of the flocs or to enhance the filterability. This is not always required but the applicant has discovered that there is be a benefit in increasing the final percentage concentration of dry solids in the dewatered sludge and/or decreasing the processing time through the use of such agents. These agents include but are not limited to materials such as reclaimed manure bedding solids, and the like.

The filtrate may be recycled back into the waste treatment system as a diluent at certain points, or the filtrate may be used in nearby farming operations such as washdowns of livestock feed barn floors, or irrigation and/or fertilization of crops. The filtrate may be further processed with sterilization means such as an ozone sterilizer, and potentially used as wash down water for milk house or other livestock operations, and/or foot bath flush water in place of cupric sulfate solutions and/or in certain instances as potable water for livestock.

The method of the present invention may be performed as a continuous process, i.e. wherein the liquid volume being treated flows continuously through a vessel formed as an elongated pipe as the reagents are added through injection ports. Alternatively, the method may be performed as a semi-continuous or batch process in which the volume being treated flows intermittently from a waste holding vessel to one or more tanks for dilution and reagent addition. Prior to adding flocculants/coagulants to the liquid waste, the liquid volume of animal waste may be first treated with a manure digester. Alternatively or additionally, the liquid volume of animal waste may undergo a first mechanical separation process, thereby removing large bulk solids by a screw press, a roller press, a rotary drum filter, or the like.

The method is also adaptable to animal waste streams comprised of different types of livestock bedding. The livestock bedding may be comprised of sawdust, straw or other shredded grain plant matter, and/or sand. In the instance in which sand is present in the waste stream, the system may include centrifugal sand-manure separator such as a hydrocyclone, and/or other mechanical equipment such as a gravity driven sand-manure separator near the waste stream source, which separates and recovers the sand for reuse in bedding.

One aspect of the invention is based on the discovery that at certain points in the process, the flocs in the liquid volume are shear sensitive, i.e. high liquid shear rates cause the flocs to be broken down and rendered difficult or impossible to economically separate in filtration equipment. By providing material handling equipment such as pumps and mixers that operate at reduced liquid shear rates, flocs are produced that are more easily separated from the liquid volume. In the optimum configuration is has been determined that movement and transfer of the flocculated manure by means of gravity is best.

Another aspect of the invention is based on the discovery that the steps of separating the liquid volume containing final flocs into a sludge and a filtrate, and dewatering the sludge are best performed by an "active filter" which first retains the solid flocs as a sludge upon a filter medium that is held in a fixed position while allowing a first portion of the filtrate to pass therethrough; and then forcibly squeezes and/or manipulates a second portion of the filtrate from the sludge contained therein by forcibly displacing the filter medium against the sludge in a squeezing or lifting action.

The use of an "active filter" to dewater the sludge is superior to other dewatering methods and filtration devices for several reasons. The active filtration process does not utilize high pressure or moving webs to apply the dewatering motive pressure to the sludge to achieve dewatering. The active filtration process utilizes displacement actuators operating under a controlled sequence to optimize the separation of the liquid from the sludge by repeatedly disrupting the sludge mass. The displacement actuators may be hydraulically or pneumatically inflated bladders, or other mechanical means and may be alternately actuated and released in programmed sequences to manipulate the waste manure sludge and dewater it.

In one embodiment, the liquid containing separable waste manure flocs may be delivered into the active filter in incremental batches, wherein a first batch of waste manure sludge is dewatered by manipulation thereof, then a second batch of waste manure sludge from the addition of a second batch of liquid containing separable waste manure flocs is partially dewatered by manipulation thereof, and so forth. As the batches of waste manure sludge accumulate sequentially in the active filter, they are dewatered each time they are manipulated by the filter medium which is displaced by the displacement actuators. When all of the batches have been delivered to the filter, the manipulation of the entire sludge volume within the filter continues until the sludge achieves the desired or ultimate level of dewatering.

The repeated disruption and manipulation of the sludge mass results in less blinding of the filtration fabric(s) with the manure sludge. The active filtration process may be fully automated and does not require manual operation of the equipment such as filter presses. The active filtration process requires significantly less energy than centrifuges, belt filter presses, vacuum drum filters or other commercially available systems. The level of discharged sludge solids concentration is easily adjustable within the active filtration process as may be required by the disposal method or end use. This is achieved by modification of the process parameters, such as displacement actuator operation, cycle time, etc.

In the preferred embodiment, the method further comprises a phase separation step that precedes the active filtration. Phase separation is performed in a gently agitated bulk tank. In general, under optimized process conditions, separable waste manure flocs float to the upper region of the tank, while the lower region containing supernatant liquid becomes less concentrated in solids. The phase separation tank is tapped at the upper region to draw off concentrated separable waste manure flocs for active filtration, and at the lower region to draw off dilute supernatant liquid for further purification. The filtrate from active filtration and the supernatant from the phase separation tank are blended together. These liquids are of sufficient clarity to optionally be further purified in an "ultraclarification unit." In one preferred embodiment, the ultraclarification unit includes a second active filter comprised of a housing, a displaceable filter medium, and displacement actuators disposed between the housing and the displaceable filter medium. The second active filter may have the form of a squeeze tower press.

In accordance with the present invention, there is also provided an apparatus for treating a liquid containing waste manure. The apparatus is comprised of a first vessel, a filtration system in liquid communication with the first vessel, a source of a first reagent material in communication with the first vessel, and a source of a second reagent material in communication with the first vessel. The first filter includes a first housing, a first displaceable filter medium, and a first displacement actuator disposed between the first housing and the first displaceable filter medium. The first reagent material is reactable with the waste manure to form first waste manure flocs of a first size, and the second reagent material is reactable with the waste manure flocs of the first size to form separable waste manure flocs of a second size larger than the waste manure flocs of the first size.

The first reagent is preferably ferric chloride, and the second reagent includes a cationic polymer. The apparatus may further comprise a source of a third reagent material in communication with the first vessel, wherein the third reagent material is reactable with the waste manure flocs of the second size to form separable waste manure flocs of a third size larger than the separable waste manure flocs of the second size. The third reagent includes a cationic polymer.

The apparatus may be configured to process the liquid containing waste manure in a continuous mode, in which the first vessel is comprised of an elongated pipe through which flows the portion of the liquid containing waste manure. The elongated pipe includes an injection port in communication with the source of first reagent material. Alternatively, the apparatus may be configured to process the liquid containing waste manure in a batch or semi-continuous mode, in which the first vessel is a tank for receiving the liquid containing waste manure. The tank is in communication with the sources of first, second, and optionally third reagent materials.

In order to achieve adequate dewatering of the manure sludge, the applicant has further invented a method to add and blend controlled amounts of amendment materials to the manure before it enters the first filter housing. These amendment materials act to disrupt the nature and stability of the gelatinous mass within the housing and promote porosity within the sludge mass during the dewatering process. This increased porosity allows for more effective dewatering of the sludge mass during the operation of the sludge disruption mechanisms by the filter. The insertion point of the amendment materials may be moved upstream in the process prior to the chemical addition points should particulate contaminants within the particular amendment materials require some level of chemical treatment to prevent these contaminants from blinding the filtration fabric in the housing.

As an alternative to or in addition to the addition of the amendment materials, the applicant has invented a method to direct air into and through the bed of the dewatering or composting manure. This air will promote air drying of the manure solids in addition to the drainage promoted by the repeated disruption of the manure mass within the housing by the bladders. In this embodiment, the active filter preferably includes air flow blocking inserts disposed along the filter medium and along the side walls of the active filter housing.

The filtration system of the apparatus may further include a second filter in fluid communication with the first filter. In one preferred embodiment, the second filter is also an active filter and is comprised of a housing, a displaceable filter medium, and displacement actuators disposed between the housing and the displaceable filter medium. The second filter may be formed as an elongated cylinder, with the displaceable filter medium is formed as an elongated tubular bag. The housing of the first filter may be also be formed as an elongated cylinder with the corresponding filter medium formed as an elongated tubular bag. In one preferred embodiment, the first filter is formed as box, with its displaceable filter medium formed as a box-shaped bag.

The apparatus may further include a phase separation tank in communication with the first vessel and the filtration system. The phase separation tank is comprised of a lower region, a middle region, and an upper region, and an inlet port in a middle region of the tank, a first outlet port in the upper region of the tank, and a second outlet port in a lower region of the tank. A mixer is preferably disposed in the phase separation tank, and includes an upper impeller, a middle impeller, and a lower impeller. The apparatus may further include a hydrocyclone for removing sand from the liquid waste manure.

The apparatus may include an improved active filter. The active filter is comprised of a box-shaped housing comprised of a bottom wall, two opposed side walls, an end wall, and a door opposite the end wall; a first filter medium formed as a box-shaped bag and including a bottom panel, opposed first and second side panels disposed along the two opposed side walls, and a third panel disposed along the end wall; a second filter medium disposed along the door opposite the end wall; and a first displacement actuator disposed between the bottom wall of the box-shaped housing and the bottom panel of the first filter medium. The opposed first and second side panels are of a sufficient length to extend around the vertical ends of the opposed first and second side walls of the housing to the outer surface of the housing, to which they may be secured with suitable fastening means. Similarly the bottom panel is of sufficient length to form a flap extending over the horizontal end of the bottom wall where it may be secured with a suitable fastening means or allowed to hang down past the horizontal end of the bottom wall. When the door of the filter housing is closed, the flap is disposed between the bottom edge of the door and the horizontal end of the bottom wall.

As a result of the methods and apparatus of the invention, animal waste from an agricultural operation such as a dairy, cattle, poultry, swine, or other livestock farm can be treated in an economical and environmentally beneficial manner. The environmental benefits are provided through improved filtrate clarity, and control and sequestration of problematic nutrients and sediments, among other factors.

An additional benefit of the invention is the ability to dewater and provide liquid manure as a solid or semi solid mass to anaerobic digestion processes. This has two particular benefits. In the instance of on-farm digester installations the ability to thicken the liquid manure prior to its introduction into the digester may allow for more cost effective digester design based upon a lower liquid volume. In the instance of remote community-type digester installations the ability to thicken the manure prior to its transfer to the community digester has the direct impact of lowering transportation costs as well as the potential benefit mentioned above of reduction in the capital cost. Furthermore, in order to accommodate the control of transportation costs the manure supply for community digesters may be dewatered with conventional mechanical means at the remote farm sites and only the dewatered solids transferred to the community digester. The fines in the filtrate from the conventional dewatering equipment represent at least 50% of the digestible organic matter in the anaerobic digester. These fines would be left at the remote farm site. The applicant's process would provide for the capture, dewatering and cost effective transportation of these solids to the community digester.

BRIEF DESCRIPTION OF THE DRAWINGS

The invention will be described by reference to the following drawings, in which like numerals refer to like elements, and in which:

FIG. 7B is a detailed cross-sectional illustration of a sidewall region of the "box" type filter of FIG. 7A showing an air flow blocking insert disposed between the filter medium and the sludge collected therein;

FIG. 8A is a schematic cross-sectional illustration of a "box" type filter with improved filter media;

Figure 1:
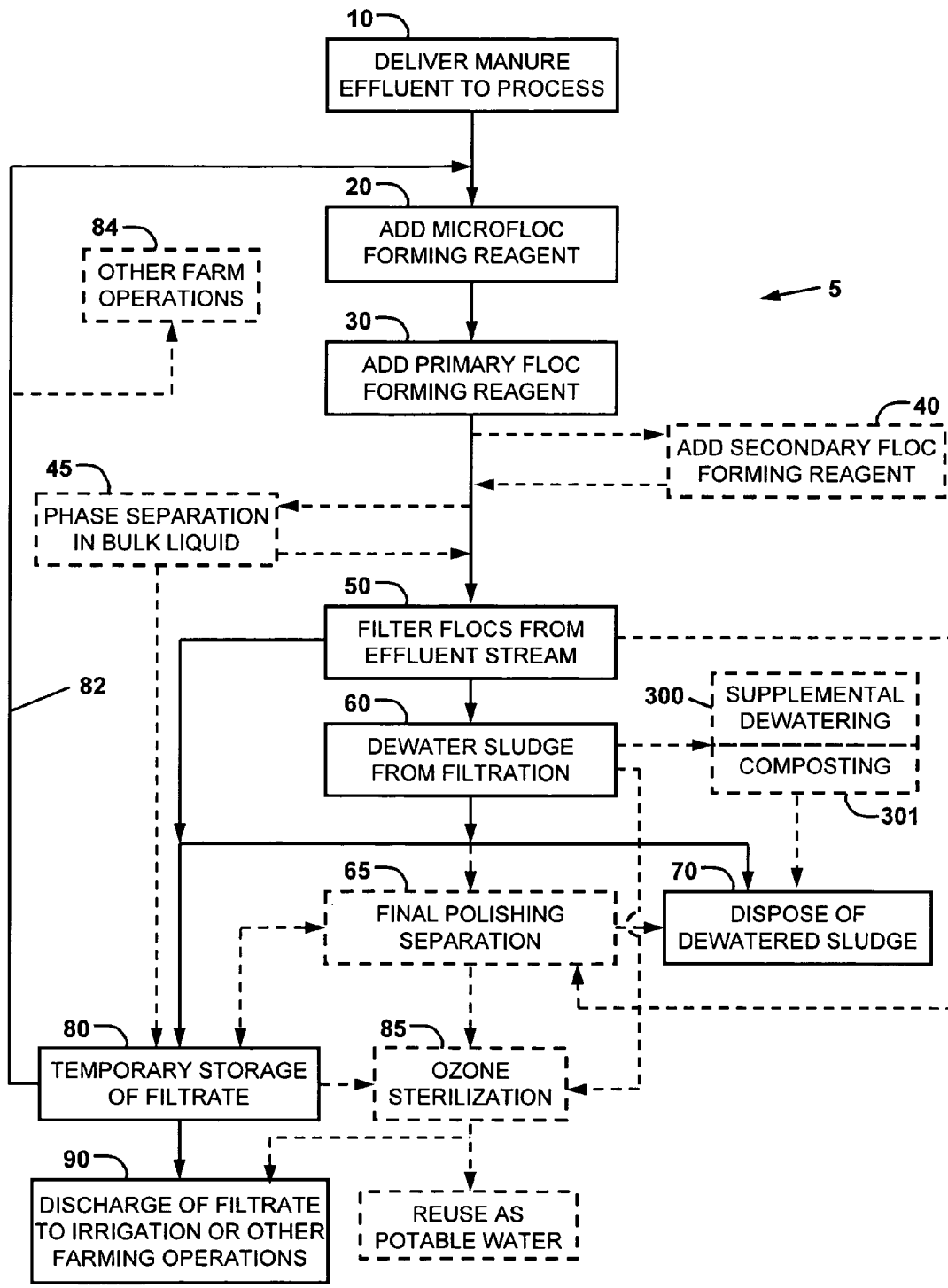
FIG. 1 is a general flowchart depicting steps of the animal waste treatment method of the present invention.

The present invention will be described in connection with certain preferred embodiments; however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements. In describing the present invention, a variety of terms are used in the description. Standard terminology is widely used in animal waste treatment art.

In this specification, the terms "animal waste," "manure waste," "manure slurry," and "manure solution" are used interchangeably, and are meant to indicate any liquid, solid, or semi-solid waste matter which contains animal manure. The waste matter to be treated typically includes both liquid and solid phases, wherein the solids phase material is comprised of digested and undigested solid particles of animal feed (hay, grasses, grains, etc.) having a range of sizes. From a rheological standpoint, the bulk waste matter may behave generally as a liquid, i.e. it easily deforms irreversibly under a small amount of shear. The waste matter may behave as a semi-solid, having a yield point and requiring a substantial amount of shear force to be exerted before flow results. The waste matter may behave more like a solid, requiring solid conveying equipment instead of liquid pumping equipment to deliver it to the applicant's waste treatment system.

Animal waste may also include urine, and animal bedding matter such as sand, sawdust, paper mill sludge, and whole or shredded plant stems, stalks, leaves, cobs, husks, recycled manure and the like. The applicant's method and treatment system are capable of treating a variety of manure wastes, including but not limited to bovine, swine, ovine, equine, caprine, bubaline, poultry, and aquatic (e.g. fish farm) manures.

In the applicant's method, referred to commercially as the Nutrient Trap Process, or "NTP", manure waste may be delivered to the process at any concentration or from any source, including raw manure from livestock pens or cages, raw manure "filtrate" from a manure separator, digested manure, and/or digester manure "filtrate" from a manure separator. The manure separator may be any manure separation equipment. The manure waste may include any form of livestock bedding as recited above. The applicant's method has been developed particularly through testing on dairy cattle manure and to a lesser degree swine manure, but the applicant believes that his method will provide similar satisfactory performance on any animal manure including but not limited to those recited above. Thus the treatment of any such manures is to be considered within the scope of the present invention. With respect to livestock farming operations in general, slurries of hog manure and chicken manure are the most prevalent additional sources of manure.

In operation of the applicant's method, the incoming manure slurry is diluted if necessary to a concentration range appropriate for the particular type of manure waste. This dilution stage enhances the chemical performance of the coagulant and flocculants, but the degree of enhancement is subject to the nature of the particular manure. In general, optimum performance of the coagulation and flocculation steps is typically achieved when the incoming manure slurry between about 1.5 and about 2.5 weight percent solids. When the applicant's waste treatment system is configured to run as a continuous process, the concentration of the manure slurry may be controlled by dilution with water, which is preferably recycled filtrate previously discharged from the filtration equipment of the system. The concentration of the manure may be measured by a nuclear absorption concentration monitor or any other similar device. For applications that contain significant upstream storage of animal waste to be treated, which would provide greater uniformity in the influent stream to the process, this control may be manually set.

The preferred filtration equipment utilized in the applicant's process, and the manner in which it is operated is a significant aspect of the present invention. The general operating principles of this "active filtration" equipment are described and shown in U.S. Pat. No. 5,614,092 of DiLeo, the disclosure of which is incorporated herein by reference. In the applicant's chemical treatment of the manure waste, the manure is chemically modified with a comparatively low cost formulation. The manure is subsequently handled in a manner that minimizes shear on the treated manure waste, such that the manure flocs are not broken up and redispersed. Subsequently, in the active filtration equipment, durable pneumatic or hydraulic bladders are inflated and deflated to manipulate the manure within the filter in a manner that accelerates manure dewatering through the filter medium. Alternately, mechanically actuated devices may be utilized to manipulate the filter medium and the manure as well.

The effluent water discharged from the applicant's process has very low suspended solids concentration, contains essentially no dissolved phosphates, and has greatly reduced levels of organic nitrogen. These results are obtained at chemical loading rates at or below conventional chemical flocculation technologies utilized in other manure waste treatment processes.

In one exemplary embodiment to be further described herein, the nutrient removal rates from the liquid manure waste consistently demonstrated by the process were as follows:

Phosphorous: ~97.5-99%++removal
Organic Nitrogen: 85% to 99% removal
Fecal Matter: 99% removal
Total Manure Solids: 94 to 97% removal
Suspended Manure Solids: Solids removed down to a particle size range of 20-50 microns; With optimum chemical treatment and associated reaction time all visually detectable solids are removed.

The resultant dewatered manure solids contain the captured manure nutrients. Without intending to be bound by any particular theory, the applicant believes that through the reaction of the ferric chloride and the phosphorous compounds in the manure slurry, ferric phosphate is produced, which is an insoluble, inert material. This ferric phosphate is captured within the filter with the dewatering manure solids. Therefore the phosphate in the dewatered solids has been rendered insoluble by the applicant's process, making it no longer available to compromise the downstream watershed. Through the chemical analysis for the manure influent to the process, the filtrate, and the dewatered solids, it is consistently observed that the phosphorous materials are substantially removed from the filtrate and remain with the dewatered solids. The organic nitrogen in the dewatered solids has been bound chemically into less soluble or insoluble forms that significantly retard their re-entry into the downstream watershed through decomposition. The chemistry of these reactions is not specifically defined due to the variety of organic nitrogen compounds. However, through the chemical analysis for the manure influent to the process, the filtrate, and the dewatered solids, it is also consistently observed that the organic nitrogen materials are substantially removed from the filtrate and remain with the dewatered solids. The dewatered solids are readily handled with common dry manure handling equipment, such as that used to spread the dry manure as a fertilizer on farm soils.

By capturing the nutrients in the manure in the dewatered solids, instead of having them dissolved in the aqueous liquid phase, two beneficial results are attained. The nutrients are not available in the liquid to cause adverse effects, such as algae blooms in the downstream watershed into which the filtrate may be discharged; and the captured nutrients in the dewatered solids make the solid a good soil fertilizer that slowly releases the nitrogen nutrients over time.

FIG. 1 is a general flowchart depicting steps of the applicant's manure waste treatment method. Referring to FIG. 1, method 5 comprises step 10, delivering a liquid containing waste manure to the treatment apparatus; step 20, adding a first reagent to the volume to produce a liquid volume containing waste manure flocs of a first size, and referred to herein as microflocs; step 30, adding a second reagent to the liquid volume containing microflocs to cause growth of the waste microflocs into separable waste manure flocs of a second size (further referred to herein as primary flocs); optional step 40, adding a third reagent to the liquid volume containing the separable flocs to cause further growth of the separable waste manure flocs, thereby producing a liquid volume containing secondary or "final" flocs; optional step 45, performing a phase separation of a portion of the flocculated solids from the bulk liquid; step 50, separating the liquid volume containing primary or final flocs into a sludge and a filtrate; and step 60, dewatering the sludge.

The filtrate may be placed in temporary storage in a holding vessel in step 80. From that point, the filtrate may be recycled back into the waste treatment apparatus as a diluent at certain points as indicated by line 82; or the filtrate may be used in step 90 in other farm operations 84 such as washdowns of livestock feed barn floors, or irrigation of crops; or the filtrate may be further processed in step 85 with sterilization means such as an ozone sterilizer, and potentially used as potable water for livestock, wash down water for milk house operations or foot bath flush water in place of cupric sulfate solutions.

The method 5 may be performed as a continuous process, i.e. the liquid volume being treated flows continuously through an elongated pipe and/or vessels as the reagents are added. In the simplest form, the elongated pipe is the reaction vessel in which the flocs of waste manure are produced. Alternatively, the method may be performed as a semi-continuous or batch process in which the volume being treated flows intermittently from a waste holding vessel to one or more vessels for dilution and reagent addition. Portions of the process, or the entire process may be embodied as a portable system, or a stationary system. The method 5 may further include the manure digestion and/or mechanical separation steps as will be described with reference to FIGS. 2 and 3.

Figure 2:
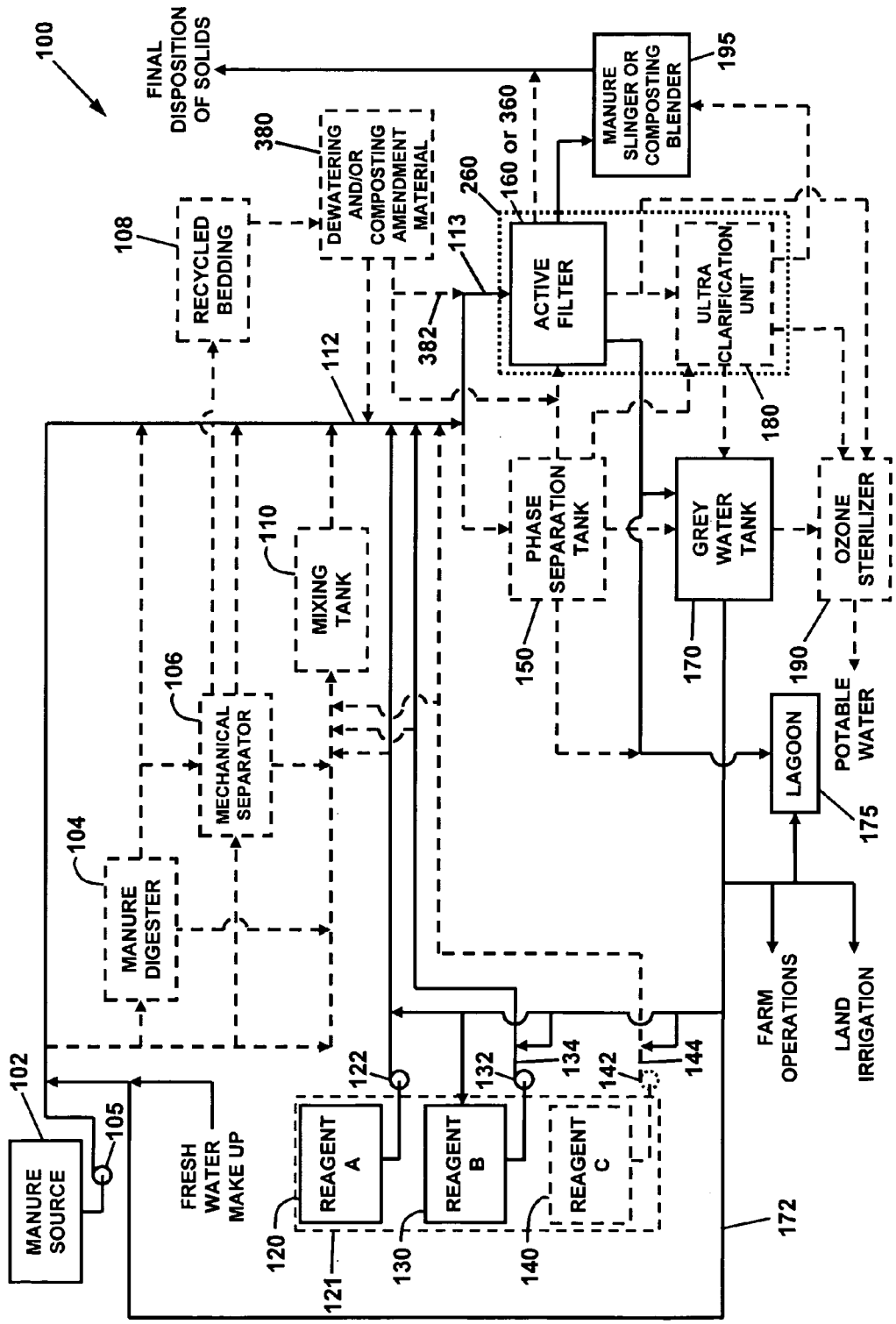
FIG. 2 is a schematic diagram of one embodiment of an animal waste treatment apparatus of the present invention.
Figure 3:
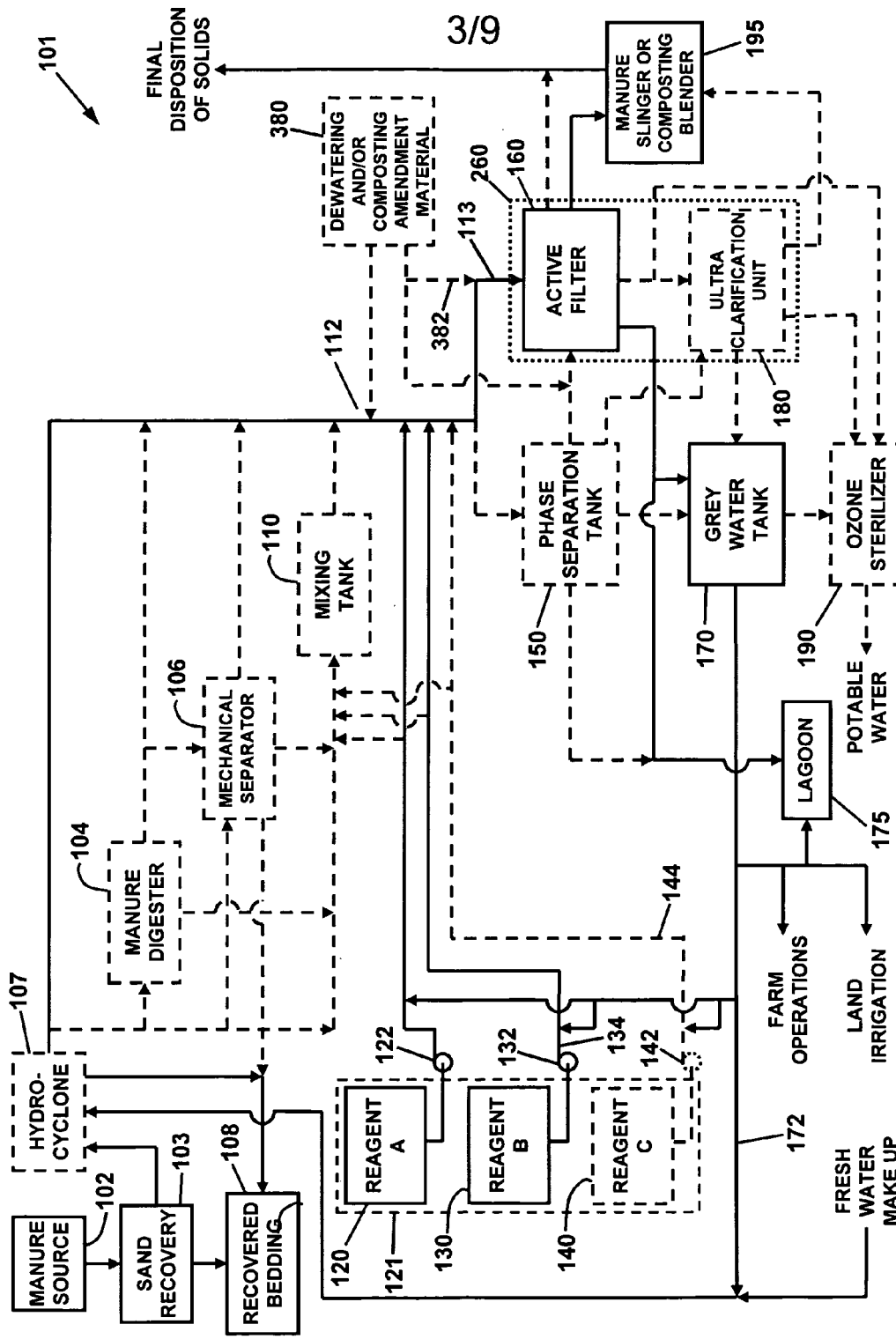
FIG. 3 is a schematic diagram of another embodiment of an animal waste treatment apparatus of the invention wherein the animal waste may include sand.

Additionally, it is noted that although the apparatus 100 and 101 of FIGS. 2 and 3 are depicted as including pumps at various locations to effect the transfer of liquids at various points, other suitable means or accommodations may be provided to accomplish the liquid transfers. For example, the apparatus could be arranged such that gravity feed is performed from various upstream points in the apparatus to downstream points. Alternatively or additionally, certain vessels could be sealed and pressurized to enable such transfers.

One preferred filter for performing step 50 of separating the liquid volume containing primary or final flocs into a sludge and a filtrate, and step 60 of dewatering the sludge, is a filter that forcibly squeezes and/or manipulates the sludge contained therein, thereby dewatering the sludge into a sufficiently dry mass to be suitable for use as compost and/or spreading as a soil fertilizer. In one embodiment that includes step 65, the filtrate is sufficiently purified by use of a polishing filter to enable discharge thereof to other farming operations requiring higher purity, should the primary filtration equipment not provide sufficient clarity.

FIG. 2 is a schematic diagram of one embodiment of a manure waste treatment apparatus that may be used to perform the manure waste treatment method 5. Liquid waste manure may be delivered to apparatus 100 at a range of different concentrations. The apparatus 100 and method 5 of the present invention are capable of treating liquid waste manure containing from between about 1% to at least about 12% weight percent solids.

To perform step 10 of method 5 shown in FIG. 1, liquid waste manure is delivered to apparatus 100 from a manure source. Manure source 102 may be one or more barns, feedlots, milking parlors, silage bunkers etc., from which manure waste is provided directly to apparatus 100. Alternatively, manure source 102 may be a manure storage vessel such as a manure lagoon or tank, or manure source 102 may be a tank truck or other transporter by which manure waste is delivered to apparatus 100. The waste manure may be diluted prior to delivery to apparatus 100 by either fresh water, or more preferably by recovered filtrate stored in gray water tank 170 or lagoon 175. The concentration of the waste manure slurry delivered to apparatus 100 may be measured by a nuclear absorption or microwave concentration monitor, or an ultrasonic flow and concentration monitor or any other similar device. One example of such a solids concentration monitoring device is a Markland 502 IL suspended solids concentration meter produced by Markland Specialty Engineering, Ltd of Ontario Canada.

Prior to the treatment of the manure waste with the chemical reagents A, B, and optionally C, one or more operations (indicated in dotted line format) may be performed on the manure waste. The manure waste may be processed in a manure digester 104 to obtain a biogas fuel such as methane from the manure. Alternatively or additionally, the manure may be processed with a mechanical separator 106 such as a screw press, a roller press, a rotary drum filter, or the like to remove large bulk solids. The solids recovered from mechanical separator 106 may be useful as recycled bedding 108 for livestock, compost or other beneficial use. The manure digestion step may be integrated downstream in the process, i.e. as digestion of the flocculated and/or filtered manure solids, as opposed to upstream, i.e. prior to the flocculation steps.

Apparatus 100 may be configured as a batch or semi-continuous process, and in such case will include mixing tank 110. A batch of manure waste is delivered from manure source 102, or from manure digester 104 and/or mechanical separator 106. As indicated previously, dilution water may be added to dilute the liquid manure waste to a required concentration range appropriate for the treatment. The dilution is performed in order to enhance the chemical performance of the reagents and to simplify downstream control. The degree of enhancement is dependent upon the particular manure waste material, which may vary in its specific chemical nature (particularly by animal species, bedding material and animal diet). Selection of the optimum concentration may be achieved through experimental observations of the response of the reagents at varying concentrations.

In order to perform step 20 of method 5, apparatus 100 is provided with a source 120 of reagent A for producing small coagulated pin flocs or microflocs in mix tank 110. As used herein, the terms "microfloc" and "pin floc" are used interchangeably and are meant to indicate precipitated solid phase particles having a characteristic dimension on the order of 20 to 100 microns. Stated alternatively, the size of the microflocs is at about the threshold of what is just barely visible to a typical human with 20-20 vision.

In the preferred embodiment, reagent A is ferric chloride although alternatively, alum (typically referred to as aluminum sulfate, without the precursor), polyaluminum chloride (PAC) or similar metal halide inorganic salt solutions may also be suitable. However, the use of the ferric chloride ($FeCl_3$) as a constituent in the manure is the most preferable and currently the most cost effective reagent. In addition, the iron byproducts of the process are considered more acceptable for integration into the soil than aluminum byproducts by the agricultural community, and in light of various environmental regulations. The effective amount of ferric chloride to be added to tank 110 (or pipeline 112 in continuous mode operation) varies based upon the nature of the particular manure to be treated. Optimum performance has been typically achieved between about 0.25 to 1.5 weight percent ferric chloride with respect to the total weight of the contents of tank 110 or the weight of a unit volume passing through the pipeline 112, depending upon the concentration and nature of the manure.

The ferric chloride may be provided as a liquid solution from source 120 via pump 122 to mixing vessel 110. Source 120 may be a holding vessel in which the solution is prepared, or source 120 may be a pre-packaged disposable container of solution that is connectable to pump 122. The concentration of the ferric chloride reagent contained in source 120 is between about 30 to about 45 weight percent solids. Source 120 may be placed upon a rack 121, which may be elevated above tank 110, such that the ferric chloride reagent can be gravity fed into tank 110. Source 130 of reagent B and source 140 of reagent C may also be located proximate to source 120 on rack 121.

Control of the ferric chloride addition, once the optimum level is determined, may be achieved by determining the pH of the slurry (i.e. the pH of the aqueous liquid phase of the slurry) at the optimum solids concentration and the optimum ferric chloride concentration. Provided the solids concentration is reasonably consistent for a given material, the optimum level of ferric chloride will be satisfied at the same pH level. The optimum pH for manure varies based upon the nature of the particular manure. Optimum performance has been typically achieved between a pH of about 6.2 to 6.9, depending upon the concentration of the manure and the nature of the manure. In most cases the manure delivered to the process will have a pH in the range of 6.5 to 7.2. In some instances the pH may be higher. In such cases, it may be economically advantageous to utilize a low cost acid or similar reagent to lower the pH to the range of the typical manure prior to the ferric chloride addition, or to blend the acidic reagent with the ferric chloride prior to its addition to tank 110.

In using apparatus 100 to treat manure, the addition of the ferric chloride may be done in a batch mode in vessel 130, or in a continuous mode by injection into the flowing waste manure slurry as it is pumped through pipeline 112. In one preferred embodiment, the ferric chloride is injected into the pipeline 112 downstream of the transfer pump 105, which pumps the manure slurry from the manure source 102 to the separation tank 150. The pipeline 112 may be provided with a motionless mixer or other mixing means therein to achieve rapid mixing of the ferric chloride with the manure slurry.

Thus in a continuous process, the mixing tank 110 is replaced with an elongated pipe 112, an injection port for addition of the ferric chloride to the flowing manure slurry, and mixing means in the pipe if necessary. A pH probe may also be provided in the pipe for use in control of the addition of the ferric chloride to the manure. Utilization of pH control provides consistent continuous processing of the slurry. For applications that contain significant upstream storage, which would provide for uniformity in the influent stream to the process, this control may be manually set.

The addition of the ferric chloride to the manure as described herein results in the formation of microflocs or pin flocs. The applicant has observed that the pin floc produced by the addition of reagent A is apparently resistant to mechanical disruption due to shear, provided that extreme shear is not imparted for extended periods. Although the applicant has not quantified the upper limit of acceptable shear energy beyond which breakdown of the pin floc will occur, is considered optimum to avoid the use of high shear material handling devices such as centrifugal pumps and mixers having high impeller speeds in this phase of the process.

At this initial step of converting the liquid manure waste into a separable solid phase, the pin floc is not filterable in a cost effective manner, nor will a solid collected in a filtration device be in a form that is easily dewatered and handled, rendering it suitable for compost or soil fertilizer. Further treatment steps are highly preferred to obtain such a solid. Step 30 of method 5, the addition of a primary floc forming reagent is performed next.

It is also noted that the flocculation process may proceed without the addition of ferric chloride. Processes are known for the treatment of animal manures with polyacrylamides alone. However, the applicant has observed that the addition of the ferric chloride, or other similar coagulating agent, enhances the performance of the polyacrylamide cationic polymers by reducing the chemical loading requirements and improving the clarity of the filtrate and the resultant removal of additional particulate matter from the filtrate.

In order to perform step 30 of method 5, apparatus 100 is provided with a source 130 of reagent B for producing primary flocs of manure waste in pipeline 112. The addition of reagent B to the microfloc containing liquid as described herein results in the formation of "primary floc," i.e. floc of a second, larger size that is cost-effectively separable from the liquid. Although the microfloc may be considered separable, given a filter medium having sufficiently small pores, and sufficient time to perform the filtration, such a filtration is usually not cost-effective or desirable as compared to the use of a reagent B to produce the primary floc. As used herein, the term "primary floc" is meant to indicate solid phase particles that have a size larger than microflocs, having a characteristic appearance of dark, small to medium curd cottage cheese in a dilute water slurry, and a typically characteristic but not required dimension of between about 0.25 inches and about 0.75 inches.

In the preferred embodiment, reagent B is a cationic polymer. More preferably, reagent B is a high molecular weight high charge cationic polymer, such as a linear cationic polyacrylamide. Even more preferably, reagent B is a water and oil emulsion of a cationic polyacrylamide including appropriate surfactants to stabilize the emulsion. One example of a suitable water and oil emulsion of a cationic polyacrylamide is Drewfloc 2425 manufactured and sold by the Drew Industrial Division of the Ashland Corporation of Boonton, N.J. Other suitable cationic polymers and water and oil emulsions thereof will be apparent to those skilled in the art.

The cationic polymer, being water dispersible, or being the preferred water and oil emulsion is provided as a liquid from source 130 via pump 132. Source 130 may be a holding vessel in which the cationic polymer liquid is prepared, or source 130 may be a pre-packaged disposable container of solution/emulsion that is connectable to pump 132. As used herein, the term "solution" when used in regard to mixtures of cationic or anionic polymers in water is meant to indicate liquids which may contain both dissolved polymer, suspended fine particles of polymer in the liquid, and/or emulsified droplets containing cationic polymer in a water and oil emulsion.

The addition of the cationic polymer may be done in batch mode in mixing tank 110, or in a second vessel (not shown) immediately downstream from mixing tank 110. Alternatively, addition of the cationic polymer may be done in continuous mode by injection of the cationic polymer into the slurry as it is pumped through pipeline 112. In one preferred embodiment, the cationic polymer is injected into the pipeline 112 downstream of the transfer pump 105, but at least ten seconds (with respect to average residence time in pipeline 112) downstream of the ferric chloride injection. This distance and time delay allows for adequate reaction of the ferric chloride with the manure to form the pin floc prior to the addition of the cationic polymer. The optimum location of the cationic polymer injection is just prior, approximately 1 to 5 seconds prior to the entrance of the manure slurry into the separation tank 150 or the active filter 160, provided there is a mechanism for mixing of the polymer within the pipeline such as a motionless mixer. This location minimizes the amount of shear forces the floc is subjected to within the pipeline but does allow for mixing of the polymer with the manure in the pipeline prior to it entering the separation tank 150 or filter 160.

To prepare the cationic polymer of reagent B, the polymer is initially dispersed and/or dissolved into solution with fresh water and or filtrate from the end of the process, which is stored in gray water tank 170 or alternately in a lagoon 175. This initial solution is optimally in the range of about 0.25 to 0.5 weight percent solid polymer. The filtrate from the end of the process is sufficiently clean to allow for its use as the water source for the cationic polymer solution in this step of the process. Subsequent to initial solution preparation, the polymer may be further diluted by addition directly to the reagent B reservoir, or by addition to the pipeline 134 near pump 132.

Crystalline forms of the cationic polymers are commercially available, which are dispersible in water and have been utilized in the applicant's process. However, their use has proven difficult and deleterious to the consistent and proper operation of the process. The uniform and reliable dispersion of the crystalline material into aqueous solutions at farm scale is problematic and is subject to inconsistency due to human error, environmental factors and equipment failures. This had led to instability in the process, instability of the flocs through the process and inadequate performance of the separation equipment, inconsistent filtration performance and filtrate clarity, etc. The crystalline forms of the cationic polymer are more expensive than the liquid forms, as is the equipment for its fully automated and/or manual dispersion, storage and handling.

The prepared reagent B solution is injected into the flowing manure stream in pipeline 112 at a highly diluted concentration. The injection of this dilution water with the cationic polymer provides for significant dilution of the manure at the point of injection of the polymer. It has been determined that this high dilution considerably enhances the efficacy of the cationic polymer in forming flocs that are amenable to filtration, particularly with the preferred active filtration equipment 160 of apparatus 100. Without wishing to be bound to any particular theory, the applicant believes that the diluted condition of the flocculated manure stream appears to be produce less shear forces on the flocs as they pass through the system. This dilution is typically performed to less than 0.1 weight percent solids. The actual degree of dilution is dependent upon the nature of the manure. For manure streams that are highly diluted such as from flush systems it may not be necessary to perform this dilution, as the manure supply will be sufficiently dilute to achieve the desired performance of the cationic polymer flocculent.

Following the injection of the polymer, a minimal period of time must be allowed for the polymer to react and flocs to form and existing microflocs to grow. This may be achieved in line in the transfer pipe 112 to the dewatering/filtration equipment 160 or in separation tank 150. The pipe 112 may be provided with a low-shear motionless mixer or other mixing means therein (not shown) to achieve rapid mixing of the cationic polymer with the manure slurry. In order to provide an extended residence time in pipe 112, the distal end thereof immediately upstream from tank 150 or filtration equipment 160 may be formed as a coil or serpentine-shaped conduit (not shown).

The primary floc prepared as described herein has been found to be shear sensitive. It is necessary to minimize the exposure of this floc to shear forces found in conventional centrifugal and diaphragm pumps and high speed agitators. Progressive cavity and/or positive displacement pumps or any pump that imparts minimum shear forces into the slurry provide the optimum performance, as compared to high shear pumps, such as centrifugal pumps. The optimum process design includes no exposure of the floc-containing slurry to pumping devices following the introduction of the flocculent reagents A and B. Low speed flocculation mixers are optimum for development of the floc at this stage of the process. The effective amount of cationic polymer for producing filtration flocs in the pipeline 112 or in mixing tank 110 if operating in batch mode varies based upon the nature of the particular manure. Optimum performance has been typically achieved between about 0.25 to 0.5 weight percent cationic polymer with respect to the weight of a unit volume in pipeline 112 or the total weight of the contents of tank 110, but is dependent upon the concentration of the manure and the nature of the manure.

At this step of converting the manure waste into a separable solid phase, the primary floc may still not be optimally filterable in a cost effective manner. In such cases an additional treatment step is preferred to obtain such a solid. Step 40 of method 5, the addition of a secondary or "large" or "final" floc forming reagent, which increases the floc size and/or mechanical stability may be performed next.

In order to perform step 40 of method 5, apparatus 100 is provided with a source 140 of reagent C for producing the secondary flocs of manure waste solids in mixing tank 110, or pipeline 112 and/or phase separation tank 150. In the preferred embodiment, reagent C is an anionic polymer, and more preferably, a high molecular weight high charge anionic polymer, such as a linear anionic polyacrylamide. One example of a suitable material comprised of an anionic polyacrylamide is Drewfloc 2270 manufactured and sold by the Drew Industrial Division of the Ashland Corporation of Boonton, N.J. Other suitable anionic polymers will be apparent to those skilled in the art.

The anionic polymer, being water soluble, is provided as a liquid solution from source 140 via pump 142 and conduit 144 to processing vessel 150. Source 140 may be a holding vessel in which the anionic polymer solution is prepared, or source 140 may be a pre-packaged disposable container of solution that is connectable to pump 142.

The addition of the additional reagent C polymer may be done in batch mode in mixing tank 110, or in a second vessel (not shown) immediately downstream from mixing tank 110. Alternatively, addition of the anionic polymer may be done in continuous mode by injection of the anionic polymer into the manure slurry as it is pumped through pipe line 112. The pipe 112 may be provided with a low-shear motionless mixer or other mixing means (not shown) therein to achieve rapid mixing of the anionic polymer with waste manure liquid. In many instances, the cost of this additional polymer is not considered economically justified based upon the satisfactory performance of the apparatus 100 in treating the waste manure with the pin floc forming reagent A and the primary floc forming reagent B.

This large secondary floc is also shear sensitive. It is necessary to minimize the exposure of this floc to shear forces found in conventional centrifugal and diaphragm pumps and high speed agitators. Progressive cavity and or positive displacement pumps or any pump that imparts minimum shear forces into the slurry provide the optimum performance. As mentioned previously, the optimum process excludes a pump following introduction of the reagent C flocculent. Low speed flocculation mixers are optimum for development of the floc at this stage of the process. The effective amount of the anionic polymer for producing larger flocs in the pipeline 112 or a mixing tank if operating in batch mode varies based upon the nature of the particular manure. Optimum performance has been typically achieved between about 0.05 to 0.15 weight percent anionic polymer with respect to the weight of a unit volume flowing in the pipeline 112 or the total weight of the contents of the mixing tank, but is also dependent upon the concentration of the manure and the nature of the manure.

The addition of the anionic polymer to the filtration floc-containing liquid as described herein results in the formation of "secondary" or "large" floc. As used herein, the terms "secondary" or "large" floc is meant to indicate solid phase particles that have a third size at least equal and usually greater than primary floc, having a characteristic appearance of dark, medium to large curd cottage cheese in a dilute water slurry, and a typically characteristic but not required dimension of between about 0.25 inches and about 0.75 inches.

The filtration and/or large floc of manure solids contained in tanks 110 and/or 150 that are produced by the method and apparatus of the present invention are filterable in a cost effective manner, and can be collected in a filtration device in a form that is easily dewatered and handled, rendering the solids suitable for use as compost and/or spreading as a solid soil fertilizer. This is because the sequence of addition of ferric chloride, then cationic polymer and optionally anionic polymer provides for a floc of sufficient stability to be effectively dewatered in an active filtration separation device and to provide a clear or nearly clear filtrate. The dewatered solids are also of a consistency that is readily discharged from the active filtration device and handled by conventional equipment such as a slinger spreader.

In an alternative embodiment, a single polymer agent such as Drewfloc 490, a quaternary ammonium cationic polymer which functions as a coagulant and as a mild flocculent, may be utilized for floc formation instead of the cationic polymer reagent B and the anionic polymer reagent C. However, the floc resulting from the chemical treatment regimen with ferric chloride plus cationic polymer provided in a liquid form, and in particular, a water and oil emulsion with appropriate surfactants has proven to be more amenable to active filtration.

The chemical treatment steps 10, 20, 30, and 40 of the applicant's manure waste treatment method 5 have been described with reference to FIG. 2, which depicts an apparatus 100 for manure waste treatment. As described previously, apparatus 100 is configured to process manure waste which contains sawdust or other cellulosic livestock bedding material. In some dairy and other livestock farming operations, sand is used as a bedding material. In order to process manure waste containing sand, an alternative embodiment of the applicant's manure waste treatment apparatus is provided as depicted in FIG. 3.

Referring to FIG. 3, apparatus 101 is comprised of a manure source 102 as described previously. Apparatus 101 further comprises sand recovery sedimentation and conveying equipment 103 and hydrocyclone 107 which separates the fine remaining sand from the manure slurry. In one embodiment, sand recovery equipment is comprised of a separation auger or similar conveyor and followed by a hydrocyclone. The hydrocyclone 107 may be as manufactured by the McLanahan Corporation of Hollidaysburg, Pa. This is standard commercially available equipment from many sources. From the point immediately downstream of hydrocyclone 107, apparatus 101 functions substantially the same as previously described herein for apparatus 100 of FIG. 2.

It is significant to note that the utilization of the applicant's process and apparatus may render the operation of the hydrocyclone, which is found essential to many sand manure recovery operations, unnecessary; or less such equipment may be required. The hydrocyclone is utilized in current practice to capture minor portions of entrained sand particulate in the effluent stream from the coarse separation equipment. Its purpose is to improve material recovery for minor incremental costs savings and for mitigation of abrasion and other inherent damage to downstream manure handling equipment. The applicant's process would not provide for the material recovery. However, the box filter is not susceptible to damage resulting from the presence of sand in the manure slurry. Furthermore, the applicant's process provides a filtrate essentially free of sand contamination allowing for more effective and flexible reuse of the filtrate within the agricultural operation.

Figure 4:
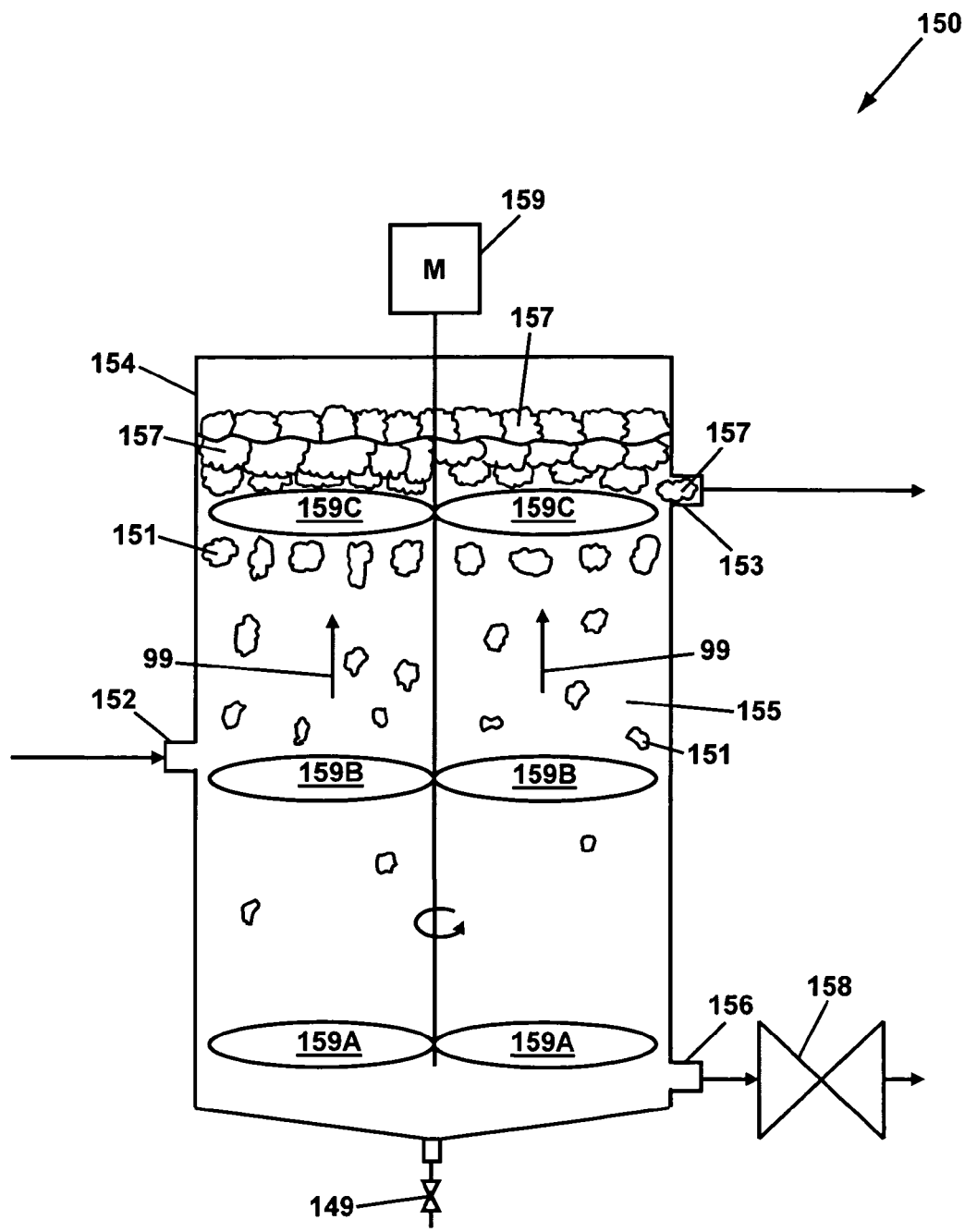
FIG. 4 is a cross-sectional schematic illustration of a phase separation tank used in the present invention.

Step 45 of method 5, phase separation of the floc from the manure may be optionally performed next, prior to filtration of the waste manure floc from the liquid. FIG. 4 is a cross-sectional schematic illustration of a Phase Separation Tank (PST) used to perform phase separation 45. Referring to FIGS. 2 and 4, the PST 150 may be employed in several embodiments of the process. In the preferred embodiment, the PST 150 is disposed in the apparatus 100 just upstream from the active filter 160. The diluted and chemically treated manure slurry from pipeline 112 enters the tank 150 at a mid point inlet 152 approximately within the middle third of the height of the tank. As the slurry enters the tank the flocculated manure 151 will tend to rise to the top region 154 of the tank 150 and float on top of the supernatant liquid 155. The supernatant liquid 155, with adequate residence time, will liberate essentially all of the flocculated solids 151 and be very low in suspended solids, potentially as low as the filtrate from the active filter. The thickened manure solids 157 near or on top of the supernatant liquid 155 flow out of the upper outlet nozzle of the PST and are delivered to the active filter 160. The agitator 159 within the tank 150 serves to keep the slurry moving within the tank and to prevent the formation of large gelatinous masses that cannot exit the upper outlet 153. In the preferred embodiment, the outlet pipe at nozzle 153 and the transfer pipe to the filter housing should be of sufficient diameter to prevent plugging and to limit hydraulic disruption of the flocculated material. It has been observed that for the phase separation tank as provided for within the embodiment above this diameter should be in excess of four inches in diameter and six inches in diameter is superior. This diameter is also important in regard to the ability to add and blend the composting and or dewatering amendment materials to the manure en route to the filter housing. As used herein, the term "hydraulic disruption" when used in regard to flocculated material in a liquid is meant to indicate disruption of the flocculated material by shear forces in the liquid, such that the size of the flocs is reduced.

The supernatant liquid is drawn off of the bottom of the tank 150 through lower outlet 156 using throttling valve 158 to control the flow rate. This rate is set such that the thickened flocculated solids at the top of the tank flow continuously out of the upper outlet 153 at a constant rate, with only minor fluctuations in the tank level. In general, at steady-state operation, the rate of inflow through inlet 152 is equal to the sum of the rates of outflow through upper outlet 153 and lower outlet 156.

The supernatant liquid 155 that exits tank 150 through lower outlet 156 may drained and/or pumped to the gray water tank 170 or to a lagoon 175. The applicant has observed that the supernatant liquid 155 is often as clear as the filtrate from active filter 160 so it is combinable with this filtrate in gray water tank 170 or the lagoon. Should the quality of the separated supernatant liquid 155 not be of sufficient clarity for its intended use, a small secondary phase separation tank (not shown) may be utilized. The volume of floating solids in this vessel will be a small fraction of the volume in the phase separation tank 150. These solids may be directed to the active filter 160 upon discharge. The now clarified supernatant liquid may be blended with the filtrate from the active filter.

The use of the phase separation tank 150 in apparatus 100 and process 5 is preferred because it reduces the hydraulic load on the active filter 160, thereby improving the overall dewatering efficiency of apparatus 100 per unit time.

In an alternative embodiment of the process, the thickened flocculated manure slurry from the upper nozzle is not sent to the active filter, but instead to a thickened manure storage vessel (not shown) or a second lagoon (not shown). The manure is allowed to accumulate and naturally dewater to the extent afforded by the elements and the design of the vessel or lagoon. This embodiment is beneficial to certain farm applications in which it is preferable to store the manure as a thickened slurry that may be rendered pumpable for seasonal spreading. The storage vessel may include an under-drain system that promotes additional natural dewatering over time. Similarly, the solids recovered in the active filter may be discharged into such a thickened manure storage vessel or lagoon and similarly further dewatered. Although it is not likely that the dewatered manure from the applicant's process will require further dewatering, the placement of the dewatered manure on such a porous surface will allow for the drainage of precipitation out or the manure to mitigate rewetting to an unacceptable level of moisture content for its intended purpose.

Step 50 of method 5, filtration of the floc from the manure slurry is performed next. The filtration process may be performed by various known filters for separating solids to form a liquid stream, such as a drum filter, a centrifuge, and the like. However, the applicant has discovered that a particular low energy active filter is preferred for performing the filtering step 50 and dewatering step 60 of method 5. The active filter may have one of two forms: a tower form, and a box form. The general principles of the active filter are described and shown in U.S. Pat. No. 5,614,092 of DiLeo, the disclosure of which is incorporated herein by reference. This patent explicitly discloses the tower form of filter; however the principle of operation though the disruption of the sludge by the manipulation of the bladders in the box form of filter is substantially the same. The filter is referred to herein as an "active filter," because of its capability to actively displace the filter medium against the solids collected thereupon. This capability makes the filter much more effective in dewatering the filtered manure sludge to a consistency where it is easily handled.

In one embodiment, apparatus 100 is comprised of one or more of filters having the tower form of active filtration, also known as a squeeze tower press (STP). One suitable version of a squeeze tower press is manufactured and sold commercially by Idee e Prodotti S.r.l. of Milan, Italy. In particular, the tower form is sold as the "Squeeze Box" model in Europe and Asia in a range of sizes having a housing or casing length between about 3 feet and about 15 feet and associated solids capacities of between about 1 cubic feet and about 7 cubic feet. This active filter is modular, such that multiple active filter units may be "ganged" together to make an overall filter system with high capacity.

This active filter is comprised of a base, a filter casing (also referred to herein as a housing) and a locking bonnet. The locking bonnet is provided with an inlet into the casing for receiving liquid with solids to be filtered that is supplied by a pump. The cylindrical filter casing contains the filter medium (typically a filter cloth) and inflatable bladders or tubes disposed between the casing and the filter cloth. The base is comprised of a releaseable hatch used to discharge the dewatered sludge, and a basin for the collection of the sludge. The filtering process takes place inside the cylindrical filter casing. Two sets of three bladders are inflated and deflated, thereby squeezing the accumulated sludge within the filter medium. The bladder inflation is controlled by the manually or by a programmable logic controller. The active filtration is carried out in three stages: loading the filter with liquid containing the solids, squeezing the solid sludge captured by the filter medium to dewater it, and separation and release of the dewatered solid from the filter medium, and release of it through the hatch at the bottom of the housing.

It will be apparent that other active filters, whether in tower form or box form, may be used to achieve suitable results. A suitable active filter is generally comprised a housing, a displaceable filter medium, and means for displacing the filter medium, such means being disposed between the housing and the displaceable filter medium. The filter displacing means is preferably comprised of at least one, and preferably two sets of displacement actuators that can be operated to displace the filter medium such that it squeezes the sludge contained on the medium. A set of displacement actuators is comprised of at least one actuator, and preferably two or more actuators. Various actuators may be used to displace the filter medium, including but not limited to hydraulic or pneumatic cylinders, solenoid actuators, cams, and the like. Inflatable bladders are preferred actuators because they are easily integrated into the filter between the housing and the filter medium, and they are simple to operate.

Further details on the operation of one or more squeeze tower presses in a filtration application are disclosed in the applicant's U.S. Provisional Application for Patent No. 60/883,315, and in the applicant's copending U.S. patent application Ser. No. 11/968,240, both titled "Method and Apparatus for Treatment of Waste Latex." The disclosures of these United States patent applications are incorporated herein by reference. Such principles of operation disclosed therein are generally applicable to the method and apparatus of the present invention.

In the preferred embodiment, the active filter 160 is comprised of one or more box filters. The box filter is preferred because of its capability of filtering large quantities of liquid manure waste; it is better matched to the scale of operations of a typical large herd dairy or other livestock farming operation. Each of the one or more box filters may comprise a removable or semi permanent filter medium in a box-shaped container. The box-shaped container is provided with a liquid filtrate outlet connectable to filter outlet 288, a plurality of bladders or other displacement actuators disposed along the horizontal walls and the bottom of the box, and a filter bag dimensioned to be contiguous with the displacement actuators and to cover appropriate portions of the walls and base of the box.

Figure 5:
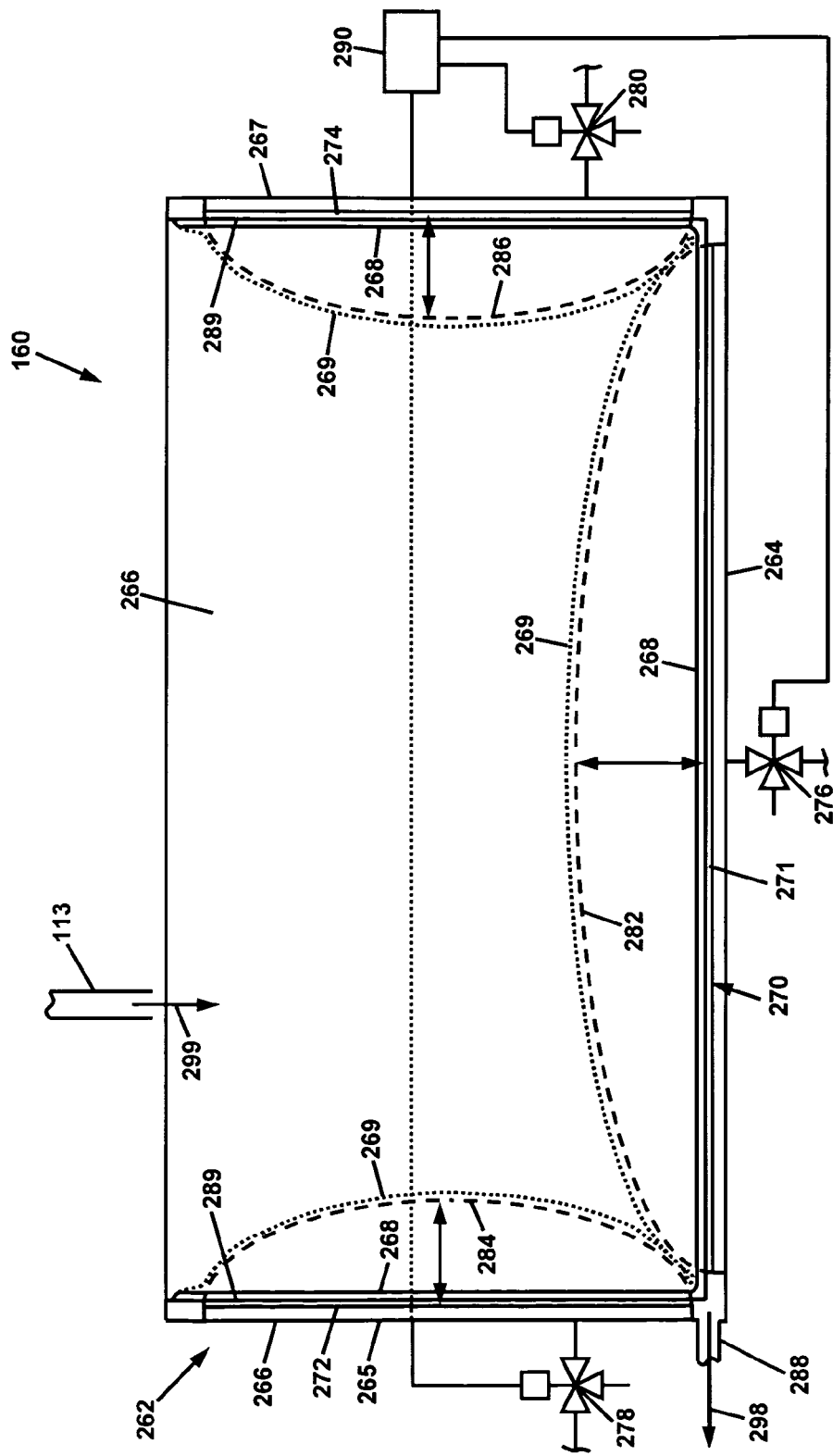
FIG. 5 is a schematic cross-sectional illustration of a "box" type filter that may be used in the present invention.

FIG. 5 is a schematic cross-sectional illustration of a suitable "box" type filter. Box filter 160 is comprised of a box-shaped housing 262 having a bottom wall 264, a surrounding side wall 266 that includes a discharge door 267, and a displaceable filter bag 268 disposed within housing 262. The discharge door 267 may be hinged vertically of horizontally. The discharge door 267 facilitates the emptying of the dewatered sludge or compost from the filter, as will be described subsequently herein with reference to FIGS. 8A and 8B. Filter 160 is further comprised of at least one inflatable bladder 270, comprised of a central portion 271 disposed along the bottom wall 264. Alternatively, the filter 160 may include two or more separate bladders extending the length of the bottom wall 264 interconnected by pneumatic or hydraulic tubing (not shown). The bladder 270 or bladders may include an end portion 272 or portions disposed along the end wall 265 opposite the discharge door 267. The bladder 270 or bladders may also include end portion 274 or portions disposed along the inside face of the discharge door 267. Bladder section 274 may be an independent bladder section interconnected to the bladder 270 or bladders by pneumatic or hydraulic tubing (not shown). The end portions 272 and 274 of bladder 270 may extend up the end wall 265 and discharge door 267 of the housing 262 less than shown in FIG. 5. The end portions 272 and 274 of the bladder or bladders may consist of a single or multiple sections disposed on the end wall or discharge door of the housing 262 interconnected by pneumatic or hydraulic tubing (not shown).

Alternatively, filter 160 may be comprised of a bottom bladder and one or more independent end wall bladders in place of end portion 272, and one or more independent discharge door bladders and two additional side inflatable bladders (not shown) disposed along the side portions (not shown) of side wall 266. If individual end wall or side wall bladders are used, they may be made independently inflatable and deflatable through respective valves 276, 278, and 280, which are controlled by programmable logic controller 290 or another appropriate control device.

Alternatively, all bladders may be connected to a single air source and all inflated simultaneously through a single valve 276 as shown in FIG. 7; or bottom bladder 271 may be connected to a first air source controlled by valve 276, and the end and or side wall inflatable bladders may be connected to a second air source such that bottom bladder 271 is separately controllable from the end and/or sidewall bladders.

In the embodiment depicted in FIG. 5, the bladder 270 is inflated and deflated by air supplied and exhausted through valve 276. The corner portions of bladder 270 may be held proximate to the juncture of the end wall 265 opposite the discharge door and the bottom wall 264 and proximate to the juncture of the discharge door 267 and the bottom wall 264 by the lower portion of a support basket or frame 289, which also supports the bottom and the vertical sections of filter bag 268 that are disposed along the bottom wall 264 and the side and end walls 266 of the housing 262. The profile of the inflated bladder 270, and alternate bladder 274 (if provided separately from bladder 270) is indicated by dotted curves 282, 284, and 286. When the bladder 270 (and alternate bladder 274 if provided separately) is pressurized, the bottom portion 271 bulges upwardly while the end portions 272 and 274 bulge inwardly, resulting in the upwardly and inwardly displaced filter bag 269 and the dewatering of the solids therein (not shown).

In one preferred embodiment (not shown), the filter 160 is comprised of first and second bladders, each having a central portion disposed along the bottom wall 264 and end portions disposed along the end wall 265 opposite the discharge door of the housing 262. These bladders are formed as elongated tubes oriented parallel to each other and disposed within the box-shaped housing 262 in a left-to-right direction in FIG. 5. The first and second bladders may be connected and operated simultaneously by pressurized air supplied through valve 276, or they may be connected to individual dedicated and separately controllable valves (not shown) such that they may be separately actuated in parallel or serially, and in programmed sequences.

As the sludge in the filter 160 is dewatered, at least one outlet 288 permits the drainage of filtrate from housing 262. If separately operable bladders are provided in the filter 160, the respective bladders may be operated sequentially to manipulate the sludge that accumulates on the filter bag 268. In one preferred embodiment, the filter 160 is provided with a pair of parallel elongated tubular bladders disposed in filter 160 as shown for bladder 270 of FIG. 5. These bladders are connected to a single air supply and are operated in parallel to displace, manipulate, and disrupt the sludge to dewater it.

To perform the filtration step 50 (FIG. 1) with the active filter 160, waste manure slurry is delivered through inlet pipe 113 as indicated by arrow 299 into the filter 160 from the phase separation tank 160, from mixing tank 110, or directly from pipeline 112 in one mode of continuous operation. A first portion of filtrate flows through the filter bag 268 by the action of gravity and out of outlet 288 as indicated by arrow 298. A cake of manure sludge (not shown) is retained by the filter bag 268. Subsequently, step 60 is performed in which the sludge is dewatered. The bladder 270 and adjacent parallel bladder (not shown) are actuated to manipulate the sludge cake, resulting in the discharge of a second portion of filtrate. In particular, the actuation of the bladder 270 causes cracks to form in the sludge, thereby providing drainage channels for filtrate to flow through the sludge, and then through the filter bag 268 and out of outlet 288.

The bladder 270 and adjacent parallel bladder may be repeatedly inflated and deflated in programmed sequences, thereby manipulating the sludge on the filter bag 268 in a manner that maximizes the dewatering thereof. Optimal performance of the system from the standpoint of dewatering has been observed to be achieved with bladder manipulation cycles as follows. Optimal operating pressure for dairy manure has been observed as 15 to 20 psig. Optimum bladder cycles have been in the range of 45 to 90 minutes of inflated time and 45 to 90 minutes of deflated time. Each manure stream may have its own optimum characteristic bladder cycle time, however.

Inflation of the bladders opens cracks in the sludge to provide drainage channels for the filtrate, and deflation of the bladders results in a closing of the cracks. Then, a subsequent Inflation of the bladders opens different cracks in the sludge to provide different drainage channels for the filtrate, and deflation of the bladders results in a closing of those cracks. In that manner, additional dewatering of the sludge cake is attained, and the sludge is dewatered into a sufficiently dry mass to be readily discharged from the filter bag and suitable for final disposition. Such disposition may be as compost or as a solid soil fertilizer, performed by a manure slinger spreader or compost blender 195 or other beneficial use or as high solids feed material for a suitably designed anaerobic digester.

One preferred mobile container for filtering the flocs and dewatering sludge is the "Dry Box 15000" active filter manufactured and sold commercially by Idee e Prodotti S.r.l and sold in the United States by Innovative environmental Products, Inc. The large scale mobile box active filter may be provided in a "roll-on" and "roll-off" configuration for overland transportation by truck. This may be advantageous hauling the recovered manure solids over longer distances for its final disposition.

In one embodiment (not shown), the applicant's apparatus 100 or 101 may be comprised of multiple box active filters 160. If multiple box active filters are used, they may be operated in sequence, with a first box receiving floc-containing liquid, then a second, and then a third, etc. receiving the liquid. In this embodiment, the slurry may require chemical treatment between each active filter to flocculate the remaining unfiltered particulate matter. Alternatively, the boxes may be operated in parallel, with all of them receiving the floc-containing liquid.

The first and second portions of filtrate may be discharged to either the gray water tank 170, the lagoon 175, the ultraclarification unit 180, or the ozone sterilizer 190. The displacement actuators may be cycled through multiple inflation and deflation cycles as described previously herein to "work" the sludge cake, such that additional portions of filtrate are discharged. Following the initial fill of and dewatering of the dry box, a second fill of the identical format may take place. Subsequent fills may proceed until the desired volume of manure floc containing liquid has been added to the box in order to achieve the desired final fill volume and total dry matter.

Although the applicant's chemical treatment of the manure containing liquid described herein is preferred prior to performing the filtration process described herein, alternate flocculation chemical regimens are known to form a suitably dewaterable manure sludge. Such regimens may provide for acceptable filtration functionality within the dry box, or potentially in a squeeze tower press type of active filter. However, the throughput, the level of solids in the dewatered cake, the ability to remove or otherwise discharge and process the solid waste manure cake, and the clarity of the filtrate may be poorer than with the proposed chemical reagent regimen of the present invention. Nonetheless, the handling of the flocs and the manipulation of the manure sludge following treatment by any chemical regimen, according to the methods of operating the active filtration equipment described herein are considered within the scope of the present invention.

Without wishing to be bound to any particular theory, the applicant believes that a significant factor in the success of the chemical treatment regimen and the gentle handling of the floc in the process vessels and/or piping, is the gentle manipulation of the floc within the active filtration equipment, in either the squeeze tower press form, or the dry box form. Alternate means of such gentle manipulation and disruption of the solids cake will have the same result and are considered within the scope of the present invention. It is noted that a rotary drum vacuum filter may offer similar dynamic action on the sludge. However, for the processing of liquid manure waste, it has been determined that the dry box version of the active filter is the most economical separation system based upon the initial cost and daily manure separation capacity. The dry box active filtration equipment in which the displacement actuators are comprised of inflatable bladders is highly portable and only requires a small volume of low-pressure compressed air for operation of the bladders. Additionally, the equipment offers significant energy and capital savings, as well as increased operational flexibility over other filtration systems.

Any chemical regimen combined with the phase separation tank as a precursor to a mechanical separation device equipment with the included accommodations for limitation of hydraulic disruption of the flocculated manure described herein are considered within the scope of one embodiment of the present invention.

It has been observed at commercial scale when processing dairy manure which has not been pre-processed in an anaerobic digester, and which has been separated from a major portion of the large bedding solids, the manure solids do not adequately dewater within the filter housing 262 through the depth of the manure mass. Without wishing to be bound by any particular theory the applicant believes the mucous cells within non digested dairy manure form a gelatinous mass when the manure is coagulated and flocculated and allowed to set within the housing 262. This mass does not adequately dewater within the standard commercial configuration of the housing. To a lesser degree the solids within the filtrate from separated digested dairy manure perform similarly, although apparently not as a result of the presence of mucous cells as they would have been significantly reduced in the digestion process.

It has also been observed by the applicant that elevated levels of the metal chloride coagulant ferric chloride mitigates the formation of the gelatinous mass to varying degrees dependent upon the source and species of origin of the manure. These elevated levels have been in the range of 100% to 200% over the normal dosage levels of the metal chloride. Polyaluminum chloride has also provided similar effects. However the presence of the aluminum contamination within the manure mass is not uniformly acceptable to the agricultural community The selection of the method or methods within the applicant's process to achieve the optimum dewatering is site (i.e. manure) specific. Disposition of the dewatered manure mass, economic factors, availability of amendment materials and the like are the parameters evaluated to determine the optimum method.

In order to achieve adequate dewatering of the manure sludge in the filter 160, a preferred embodiment includes a method to add and blend controlled amounts of amendment materials to the manure before it enters the filter housing. A description of the amendment materials addition process is provided subsequently herein in conjunction with addition of composting amendment materials. These amendment materials act to disrupt the nature and stability of the gelatinous or poorly dewaterable mass within the housing and promote porosity within the mass during the dewatering process. This increased porosity allows for more effective dewatering of the mass during the operation of the disruption mechanisms. The insertion point of the amendment materials may be moved upstream in the process prior to the chemical addition points, should particulate contaminants within the particular amendment materials require some level of chemical treatment to prevent these contaminants from blinding the filtration fabric in the housing.

As an alternate to or in addition to the addition of the amendment materials a further embodiment includes a method to direct air into and through the bed of the dewatering or composting manure. This air will promote air drying of the manure solids in addition to the drainage promoted by the repeated disruption of the manure mass within the housing by the bladders.

As an alternate to or in addition to the above, elevated levels of the metal chloride coagulant ferric chloride may be added to the manure stream at the indicated point of injection into tank 110 or pipe line 112 to mitigate the formation of the gelatinous mass in the dewatering manure.

Optional step 65 of method 5, a final "polishing separation," i.e. removal of additional solids from the filtrate discharged from active filter 160 or from the bottom outlet 156 (FIG. 4) of the phase separation tank, may be performed next. The polishing filtration process may be performed by various known filters for performing fine particle filtration. However, a particular low energy dynamic filter is preferred for performing step 65 of method 5, that being the aforementioned squeeze tower press active filtration, as disclosed in U.S. Pat. No. 5,614,092 of DiLeo, and further described herein. Depending upon the downstream process requirements, polishing of the filtrate may instead be successfully completed in a dry box.

Ultraclarification unit 180, which in addition to active filter 160, is part of the overall filtration system 260, is used to perform step 65 and may include one or more squeeze tower presses (not shown). The squeeze presses may be operated in sequence, with a first press receiving floc-containing liquid, then a second, and then a third etc. receiving the liquid. In this embodiment, the slurry may require chemical treatment between each filter to flocculate the remaining unfiltered particulate matter. Alternatively, the presses may be operated in parallel, with all of them receiving the floc-containing liquid. The flocs in the liquid are retained in the filter medium contained therein as a semi-solid sludge, while a first portion of filtrate is discharged to gray water tank 170 or lagoon 175, or more preferably, to ozone sterilizer 190, in which the filtrate is converted to bacteria-free water suitable for reuse as wash down water for milk house or other livestock operations, or livestock foot bath flush water in place of cupric sulfate solutions, or in certain instances as potable water for livestock. The solid manure floc captured in the squeeze tower press(es) is discharged to a manure slinger spreader or composting blender 195 for subsequent use as compost or a solid fertilizer. Details on the operation of a squeeze tower press are disclosed in the applicant's aforementioned copending U.S. Provisional Application for Patent No. 60/883,315, "Method and Apparatus for Treatment of Waste Latex," at pages 23-32 and in FIGS. 3 and 4; and in the applicant's aforementioned copending United States patent application No. 11/968,240 at pages 37-46 and in FIGS. 3A, 3B, and 5. Such operational details are generally applicable to the present invention.

The squeeze tower press has also been utilized as the active filter 160 in apparatus 100. In general, the filtrate from the squeeze tower press is lower in suspended solids and higher in clarity than that discharged from the dry box active filter. The filtration medium in the squeeze box may be of a much finer mesh than can economically be provided for or operated within the dry box filter. Additionally, it has been demonstrated that the treatment of the filtrate from a dry box filter through an identical or similar chemical process as described herein, and then through a squeeze tower press, or under optimum conditions through only a dry box filter, produces a final filtrate that has essentially total phosphorous nutrient solids removal from the filtrate in the range of about 95 to 99 weight percent. Furthermore the suspended solids are removed from the liquid manure stream at a rate of 94 to 99 weight percent.

The manure sludge resulting from the use of the dry box filter is typically in the range of about 12 to 20 weight percent dry solids. The manure sludge resulting from the use of the squeeze tower press is typically in the range of about 9 to 22 weight percent dry solids. Higher dry solids may be achieved, but the resilient nature of the dewatered manure sludge makes automated discharge of the sludge from the squeeze tower press difficult and time consuming. Additionally, the performance of the squeeze tower press is sensitive to over-pressurizing the dewatered manure solids and over-feeding the separation equipment. Breakdown of the floc and/or packing of the filter have been experienced from these operating conditions. The extent of these problems vary to some degree with the type of manure being processed. The applicant has observed that liquid manure with percentages of bedding solids below the range of one to two percent by weight do not demonstrate this problem.

The degree of dewatering from the process is dependent upon several factors such as the dewatering period and/or the presence of inert or large particulate matter in the manure. Manure that has not been first processed by a manure mechanical separator 106 will achieve a higher degree of dewatering at a faster rate than the "filtrate" from such a separator. As discussed previously, the applicant believes that additional large or inert particulate matter remains in the manure stream and provides for enhanced filtration. Addition of a small portion of separated solids from a manure separator to the separator "filtrate" that is being processed within the applicant's process will enhance the filtration. Addition of this material may be added to the slurry in batch or continuous mode.

Figure 6:
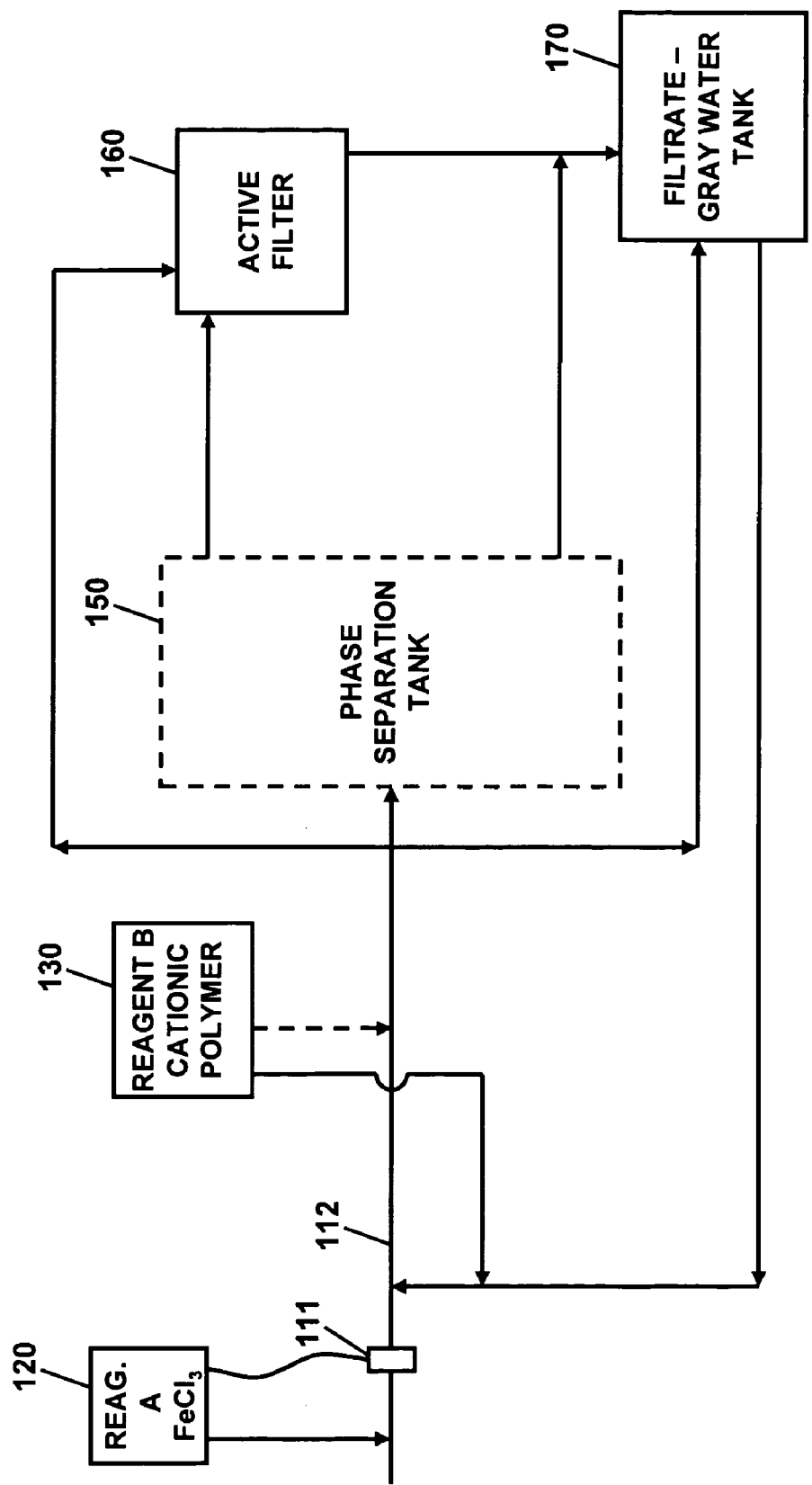
FIG. 6 is a schematic illustration of one embodiment of the applicant's waste treatment apparatus including simple instrumentation and control loops.

The applicant's method 5 and apparatus 100 and 101 are amenable to automated process control with the addition of simple instrumentation and control loops. FIG. 6 is a schematic illustration of one embodiment of the applicant's waste treatment apparatus including such process control components. A pH meter 111 with a probe disposed in pipeline 112 may be used to monitor the pH of the waste manure liquid in the pipeline. The value of the pH in the pipeline may be used by a programmable logic controller (not shown) to control the rate of addition of reagent A.

The phase separation tank 150 (PST) may be employed in several embodiments of the process. Referring further to FIGS. 4 and 6, preferably the PST 150 is inserted in the process just prior to the dry box active filter 160. The diluted and chemically treated manure slurry enters the tank 150 at a mid point port 152 approximately within the middle third of the height of the tank. As the slurry enters the tank, the flocculated manure will tend to rise to the top of the tank and float on top of the supernatant liquid. The supernatant liquid, with adequate residence time, will liberate essentially all of the flocculated solids and be very low in suspended solids, potentially as low as the filtrate from the dry box.

The supernatant liquid is drawn off of the bottom portion of the tank with throttling at a controlled rate. This rate is set such that the thickened flocculated solids 157 at the top of the tank flow continuously out of the upper outlet at a constant rate with only minor fluctuations in the tank level.

The supernatant liquid may be drained and/or pumped to the gray water collection tank 170 or to lagoon 175. The supernatant liquid is typically as clear as the filtrate from the dry box active filter 160, so it is typically combined with said filtrate after the dry box. The thickened manure solids 157 flow out of the upper outlet nozzle of the PST and drain to the dry box. This mechanism reduces the hydraulic load on the dry box, thereby improving the dewatering efficiency measured as a function of time.

One exemplary phase separation tank 150 will now be described in more detail. In one embodiment, the phase separation tank 150 is a cylindrical tank. The nozzle 156 for the draw off of the supernatant liquid from this tank is preferably located at least 6 inches above the bottom of the tank 150 to prevent entrainment of any settled sediment (such as sand fines or other sediment that is more dense than water) in the liquid. The bottom of the tank 150 is preferably pitched to a bottom clean out valve 149 in order to allow for periodic cleaning of the sediment from the bottom of the tank 150.

The agitator 159 within the tank serves to keep the slurry moving within the tank and to prevent the formation of large gelatinous masses that would not exit the tank nozzles. The blades of the agitator are preferably set in the lower, middle, and upper thirds of the tank. The bottom agitator blade 159A is preferably at least 24 inches above the bottom of the tank. This is preferred to allow for adequate stilling of the supernatant liquid and to prevent entrainment of any sedimentation from the bottom of the tank into the supernatant liquid. The top blade 159C of the agitator is preferably at or just below the level of the top outlet nozzle. The three-agitator mixer 159 as shown in FIG. 4 is preferred, although a single agitator mixer that provides gentle circulation of the slurry in the PST 150 to assist phase separation may be suitable.

The applicant has observed that for some manure wastes, the density of the flocculated solids 157 is greater than the density of the supernatant liquid 155. Accordingly, the phase separation of the solids 157 and the supernatant liquid 155 occurs in a manner opposite to that shown in FIG. 4, i.e. the solids 157 settle toward the bottom region of the tank 150. In this situation, the flocculated solids 157 are discharged through lower outlet 156, and the supernatant liquid 155 is discharged through upper outlet 153. To accommodate this situation, the apparatus 100/101 (FIGS. 2 and 3) may be provided with selector valves and additional piping (not shown) to route the effluent stream with solids 157 to the filter 160, and the supernatant liquid to the gray water tank 170 or lagoon 175 of the ultraclarification unit 180, regardless of which of outlets 153 and 156 they are discharged from. As discussed above the diameter of the flocculated solids handling pipe en route to the filter housing must be of sufficiently large diameter to prevent plugging and limit hydraulic disruption of the flocculated manure as well as accommodate the addition of amendment materials.

Should the quality of the separated supernatant liquid require additional treatment in order to accommodate an intended use, it may be collected in a small secondary phase separation tank (not shown). The volume of floating solids on top of the liquid in this vessel would be a small fraction of the volume in comparison to the floating sludge 157 in the phase separation tank. The solids in the small secondary phase separation tank may be drawn off through the top exit fitting and directed to the active filter 160 upon discharge. The now clarified supernatant liquid may be blended with the filtrate from the active filter 160. Alternatively the filtrate may be retreated with the process treatment chemicals and filtered through a squeeze tower press or additional box filter.

Based upon experimental trials, the optimum tank configuration appears to be three to five feet in diameter by 10' to 12' high. The pitched, wide profile agitator blades 159A/159B/159C are set approximately 24 inches off the bottom of the tank, near the middle 5' foot level and near the 8' level of the tank. The agitator speed will vary with the nature of the solids within the manure slurry; however 20 to 30 rpm appears to be an optimum speed. The optimum flow rate for this configuration of tank appears to be in the range of 30 to 60 gallons per minute, as five to 10 minutes, and in some cases as much as 20 minutes, appears to be the optimum residence time to achieve the separation of the clarified supernatant liquid phase from the thickened flocculated solid slurry phase.

Not wishing to be bound by any particular theory, the applicant observed that the performance of the separation tank appears to be a function of the chemical concentrations within the liquid manure, the concentration of the manure, and the type and source of the manure. In certain instances where the conditions are not able to be optimized for physical or economic reasons, the separation tank may simply serve as a residence tank utilized to ensure that the reaction between all of the reagents and the liquid manure, and the resulting flocculation is complete.

Figure 7A:
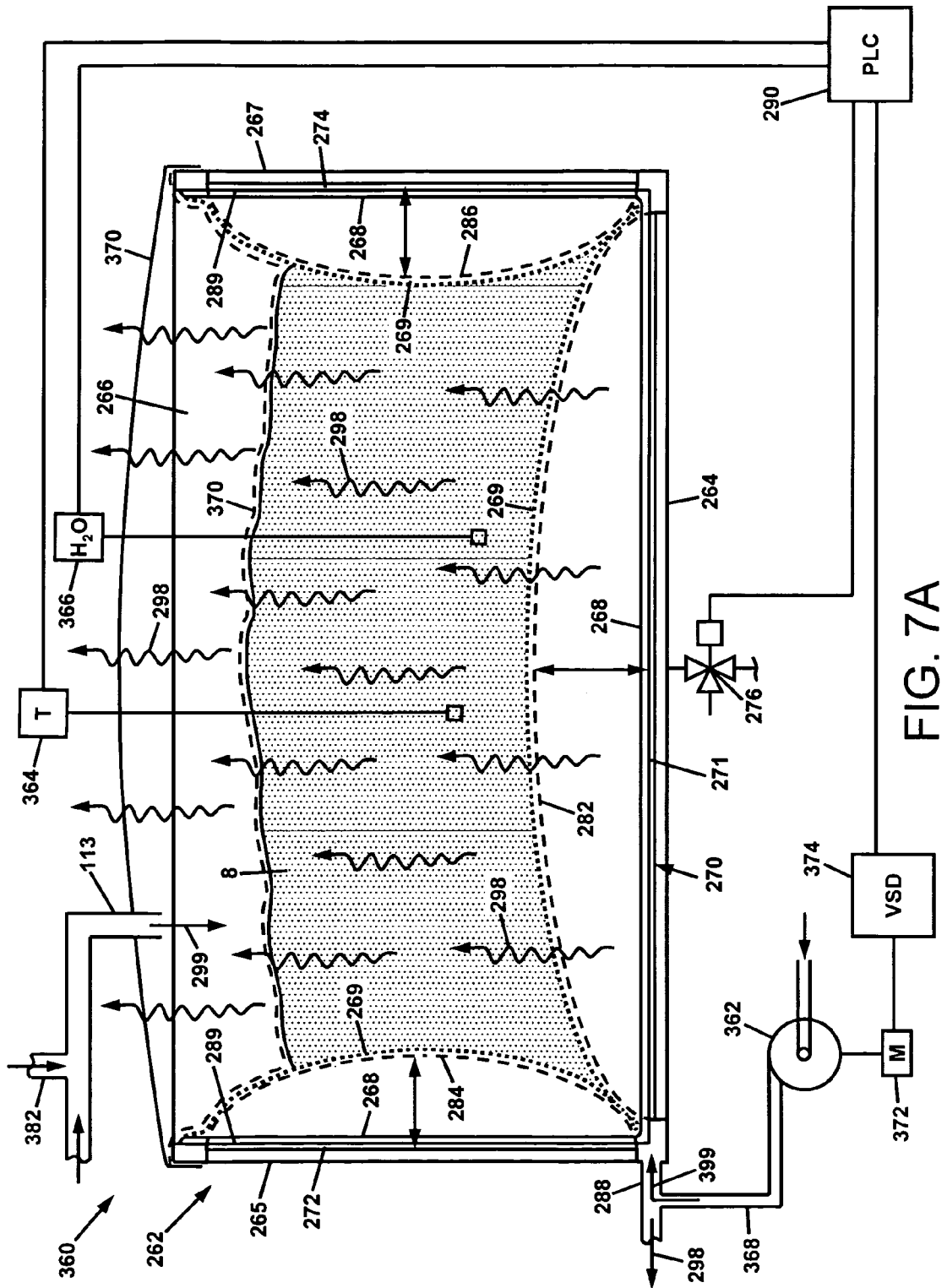
FIG. 7A is a schematic cross-sectional illustration of a "box" type filter including means for producing compost from the sludge collected therein.

In a further embodiment, the applicant's apparatus and method may be configured to produce compost material directly within the active filter, instead of in composting blender 195. FIG. 7A is a schematic cross-sectional illustration of a "box" type filter including means for producing compost from the sludge collected therein. Filter 360 of FIG. 7A is similar to filter 160, but is shown as comprising a first elongated inflatable bladder 270 comprised of a central portion 271 disposed along the bottom wall 264 and a first end portion 272 disposed along the end wall 265 of the box housing 262. Bladder 270 may further comprise a second end portion 274, or alternate portion 274 on the discharge door of the housing 262 provided as a separate bladder. Filter 360 is preferably comprised of a similar second elongated tubular bladder (not shown) oriented parallel to bladder 270 and disposed within the box-shaped housing 262 in a left-to-right direction in FIG. 7A. Both of such bladders may be connected and operated simultaneously by pressurized air supplied through valve 276 under the control of programmable logic controller 290.

Filter 360 is configured such that it may be utilized as a composting vessel for the manure upon completion of the dewatering phase. Filter 360 may also be suitable for composting of municipal waste water treatment plant sludge. In addition the same configuration may be utilized to achieve the supplemental dewatering of the manure discussed above as it relates to mitigation of the problem of gelatinous masses of sludge from non digester manure or poorly dewaterable manure from manure separator filtrate. Variations between the composting operation and the supplemental dewatering operation are identified herein. The means for producing compost from the sludge includes at least one ventilating fan 362, at least one probe 364 for measuring the temperature of the sludge, and may include at least one probe 366 for measuring the moisture content of the sludge. The means for supplemental dewatering of the sludge includes at least one ventilating fan 362, and at least one probe 366 for measuring the moisture content of the sludge. The sensors 362 and 364 are contactable with a volume enclosed within the first displaceable filter medium, and thus are contactable with the dewatered sludge 8 contained therein. The ventilating fan 362 is in communication with the space between the housing 262 and the displaceable filter medium 268 of the filter 360 through a duct 368, which may be connected to the liquid outlet 288 in the housing 262, or to a separate port. The duct 368 is preferably a flexible duct commonly used in air handling operations. Duct 368 is connected to the housing in a horizontal or downward direction and contains a shut off valve (not shown) so as not to become flooded with filtrate during the dewatering process, with it being understood that duct 368 is shown oriented downwardly in FIG. 7 for the sake of simplicity of illustration.

During the composting step or the supplemental dewatering step of the applicant's process, fan 362 is operated, forcing outside air through duct 368 and into the box housing 262 as indicated by arrow 399 along the bottom wall 264 and the lower portions of the side wall 266 of the box housing 262. The pressurized air passes around the bladder 270, through the filter bag 268, and into the dewatered manure sludge 8 as indicated by serpentine arrows 298. The flowing air continues to percolate upwardly through the dewatered sludge 8, and out through a porous and permeable or vented waterproof and partially insulating cover 370, which is secured over the open top of the box housing 262.

The supply air to the housing may be heated during cold periods to enhance drying and to mitigate freezing of the manure mass. This may be accomplished with a gas fired air heater or heat exchanger (not shown) or through the use of a heat exchanger or other method (not shown) to recover supplied process heat or rejected heat from adjacent or proximate equipment. The heating device may be installed into the inlet ducting or the outlet ducting of fan 362.

The air supply to the housing 160 may enter through an alternate, dedicated entry nozzle in the wall of the housing. Within the housing in the space between the filtration fabric and the housing bottom wall the air may be delivered to the close underside of the dewatering or composting manure. This may be done through a matrix of distribution piping within the space between the bottom wall and the filtration fabric in the housing (not shown). The air may be delivered from the distribution piping to just beneath the bed of dewatering or composting manure through small nozzles or perforated piping or the like (not shown).

One suitable membrane or cover 370 is the W.L. Gore and Associate's GORE™ Cover System. The fabric of this system is comprised of a microporous membrane that is laminated between two ultraviolet resistant support fabrics. The cover is waterproof and windproof to protect composting or dewatering material from the elements, but it is also permeable to water vapor, allowing moisture to be released, along with $CO_2$ generated from composting. The cover also provides some insulating properties that help maintain composting temperatures. This cover 370 may be mechanically supported over the top of the housing 262 as indicated in FIG. 7A in solid line format, or cover 370 may be tethered to the outside of housing 262 and allowed to drape down into the housing and rest upon the composting materials, as indicated in FIG. 7A in dotted line format.

In the operation of the applicant's composting filter, it is preferable that all of the pressurized air delivered by fan 362 is flows only through the sludge 8. However, absent any countermeasures to the contrary, a significant portion of the pressurized air may bypass the dewatered sludge 8, and instead flow upwardly along the side walls 266, the end wall 265 and the door 267 where the supporting framework holds the filter medium 268 separate from the wall surfaces. The bypass flow may escape out through the portion of the filter medium 268 that is not covered by sludge, and/or through other passageways near the top of the framework. Accordingly, in one preferred embodiment, the applicant's composting filter is further comprised of means to block such bypassing airflow, thereby forcing substantially all of the airflow to pass through the dewatered sludge and facilitate the composting or supplemental dewatering thereof.

FIG. 7B is a detailed cross-sectional illustration of a sidewall region of the "box" type filter 360 of FIG. 7A showing an air flow blocking insert disposed between the filter medium and the sludge collected therein. Insert or panel 310 is comprised of a thin planar sheet 312 of material that extends downwardly along the inside of side walls 266 between the sludge 8 and the filter cloth 268. A hanger channel 314 comprised of short horizontal section 316 and vertical section 318 is formed at the upper end 320 of the sheet 312 for engaging with the upper edge 263 of the side wall 266. Prior to the beginning of the composting of the sludge 8, the insert 310 is forced down along the filter cloth 268. Insert 310 may cover substantially the entire area of the side wall 266, or multiple inserts 310 may be provided, such that the set of inserts covers the entire area of the side wall 266. In like manner, corresponding air flow blocking inserts are similarly fitted along the door 267 at the end of the filter box housing 262. For elimination of bypassing aeration air at the end wall 265 of the housing 262 opposite the discharge door the vertical section 272 of the bladder may be excluded with insert 310 being used. Alternately, if the vertical section 272 of the bladder is present, the end wall 265 may be covered with a flexible non permeable plastic membrane prior to initiation of the filling and dewatering operation.

In this manner, the air flow blocking inserts 310 and the flexible fabric at the end wall 265 prevent the air from short circuiting around the composting material 8 and out through the sections of the filtration fabric 268 not covered by composting material and/or through other passageways near the top of the underdrain structure supporting the filter cloth. The air blocking panels 310 may be fabricated of rigid plastic materials such as CPVC or polypropylene or any other rigid material that will maintain its structural integrity at the composting temperatures, and provide sufficient rigidity to enable forcing the panels down along the filter cloth 268 into the desired position. The edges of the panels 310 may be deburred and/or radiused to prevent cutting of the filter cloth. The top portion of the air blocking panels 310 may be vented or inserted in such a manner to allow for the passage of a small volume of ventilation behind the panels. Alternately a contiguous top rail for the support structure of the underdrain system (not shown) may be constructed which would include ports to accommodate this venting. Numerous alternate means of blocking the bypassing of the air flow may include flexible materials which drape down the face of the exposed filtration fabric 268 as the mass of composting manure shrinks exposing more surface area of fabric 268. Thus the blocking of the bypassing aeration air by any such means is to be considered within the scope of the present invention.

The fan may also be configured by providing additional ducting and valves to withdraw air from the space between the housing 262 and the displaceable filter medium 269 of the filter, instead of or in addition to supplying air thereto. This functions to provide downward ventilation through the compositing material. This functionality may be utilized in cases where odor control and other beneficial aspects of the downward air flow are needed.

Referring also to FIG. 2, and in one embodiment, the applicant's apparatus 100 is provided with a source 380 of composting or dewatering amendment materials. The source 380 may be a hopper, a bin, or other suitable container. The amendment material may be e.g., wood chips, or other materials to be described subsequently herein. The apparatus 100 is further comprised of an auger (not shown) or other conveying means for delivering the amendment materials to the filter 360. In the preferred embodiment, the auger delivers amendment materials from the source 380 through a duct 382 that is connected to the inlet pipe 113 through which the flocculated waste manure flows to filter 360. In that manner, the amendment materials may be uniformly distributed throughout the waste manure prior to its entering the filter 360.

The supplemental dewatering step 300 of the applicant's process will now be described with reference in particular to FIGS. 1, 2, and 7. Referring first to FIG. 1, the applicant's process 5 is performed such that steps 50 and 60 are completed, i.e. filtration and dewatering of the manure sludge in the filter 360 to the extent possible. The filter 360 is filled with the semi dewatered manure sludge to the desired level, which is sufficient to cover most of the free area of the filter cloth 269 along the side wall 266 of the box filter housing 262. During the step 50 of delivery of flocculated waste manure to the filter 360, dewatering amendment material may also delivered through duct 382 and combined with the flocculated waste manure. The semi-dewatered sludge 8 in the filter 360 may thus be a mixture of manure and dewatering amendment material.

These amendments typically consist of materials such as wood chips. In addition, these materials may include straw, whole or shredded plant stems, stalks, cobs, husks, and the like and/or dewatered manure solids from high energy dewatering equipment such as screw presses, poultry litter and the like. These materials may be added to the manure stream immediately prior to discharge point of the manure into the active filter box as described previously herein. The required amendment material and proportion of addition depends upon the type of manure being processed.

When the active filtration dewatering step 60 is complete and no significant flow of filtrate out through outlet 288, the supplemental dewatering step 300 is begun. The fan 362 is started. Fan 362 is driven by motor 372, the speed of which may be controlled by variable speed drive (VSD) 374, which is in communication with and operated by programmable logic controller (PLC) 290 or other suitable speed control device. The fan 362 is operated for a period of time at a first speed to partially dry the dewatered sludge to a desired predetermined value that results in its effective end use. The moisture content of the sludge 8 is measured by moisture sensor 366, which is in communication with PLC 290 or by manual means. Once the desired level of dryness of the manure sludge 8 is achieved, the fan is shut down. The dewatered sludge may be discharged from the filter 360 for final disposition.

The composting step 301 of the applicant's process will now be described, also with reference in particular to FIGS. 1, 2, and 7. Referring first to FIG. 1, the applicant's process 5 is performed such that steps 50 and 60 are completed, i.e. filtration and dewatering of the manure sludge in the filter 360. The filter 360 is filled with dewatered manure sludge to the desired level, which is sufficient to cover most of the free area of the filter cloth 269 along the side wall 266 of the box filter housing 262. During the step 50 of delivery of flocculated waste manure to the filter 360, compost material may also delivered through duct 382 and combined with the flocculated waste manure. The dewatered sludge 8 in the filter 360 may thus be a mixture of manure and compost amendment material.

When the dewatering step 60 is complete, and no significant flow of filtrate out through outlet 288, the composting step 301 is begun. The fan 362 is started. Fan 362 is driven by motor 372, the speed of which may be controlled by variable speed drive (VSD) 374, which is in communication with and operated by programmable logic controller (PLC) 290, or other suitable speed control device. The fan 362 is operated for a period of time at a first speed to partially dry the dewatered sludge to a desired predetermined value that results in effective composting. The moisture content of the sludge 8 is measured by moisture sensor 366 in communication with PLC 290, or by manual means. The desired moisture content is dependent upon the type of manure in the filter 360, the carbon to nitrogen ratio of the manure, and the amount (if any) of compost material added to the manure during the filtration step 50.

Once the desired level of dryness of the manure sludge 8 is achieved, the fan VSD control 374 may be set to control the flow of air to the box which will in turn maintain the temperature of the manure solids at predetermined values or value ranges for predetermined time period that is effective for composting of the particular manure. The temperature of the sludge 8 is measured by temperature sensor 364, which is in communication with PLC 290. It is also noted that during the composting step 300, the inflation and deflation of the bladder 270 of the active filter 360 may be continued, such that the sludge therein is continually disrupted. In that manner, more uniform airflow, moisture content, and temperature set points are maintained within the composting sludge 8. When the time period is complete, the composting step is terminated. The fan 362 is run until the compost is cooled to a desired temperature and/or shut down, and the air flow through the composted sludge 8 ceases. The composted sludge may be discharged from the filter 360 for final disposition.

In the case of most manure streams emanating from dairy or swine operations, the level of dryness resulting from the standard operation of the active filter dewatering cycle will provide a moisture content and/or porosity within the manure which may not be satisfactory for the initiation of composting biological activity. In order to provide for the manure mass to achieve the required moisture content, there may be a need to add "amendments", i.e. suitable composting materials to the manure. These materials also improve the porosity of the manure bed, which promote better aeration of the bed and thereby enhance the biological activity therein.

These amendments typically consist of materials such as wood chips. In addition, these materials may include straw, whole or shredded plant stems, stalks, cobs, husks, and the like and/or dewatered manure solids from high energy dewatering equipment such as screw presses, poultry litter and the like. These materials may be added to the manure stream immediately prior to discharge point of the manure into the active filter box as described previously herein. The required amendment material and proportion of addition depends upon the type of manure being processed. In general, amendment levels are expected to be in the range of 0.5 to 1 pounds of dry amendment per dry pound of manure solids in the liquid manure stream. The relationship between baseline moisture content of a particular dewatered manure slurry without amendment and the required level of amendment to render that dewatered slurry suitable for composting is generally known to those skilled in the art. In general, the moisture content of the manure and amendment blend is in the range of about 40 to about 65 weight percent solids in order for composting biological activity to commence and be sustained.

Temperature vs. time cycles for composting are also known to those skilled in the art. The speed of the aeration fan 362 is set to control the temperature in the composting sludge 8 through the PLC 290 to maintain the desired temperatures and hold periods for optimum mesophilic (20-40° C.) and the thermophillic (50-70° C.) bacterial action associated with the particular manure. These terms "mesophillic" and "thermophillic" refer to specific types or composting families of bacteria which are active at these respective temperatures.

The amendment may be added to the flocculated manure stream through an opening in the supply pipe 113 or into an enlarged section of the supply pipe 113 that feeds the filter 360. Alternate locations for the addition of the amendment are considered to be less preferable. Introduction of the amendment too far up stream of the filter 360 may promote excessive absorption of water into the amendment materials, thereby reducing their effectiveness in moisture adjustment and porosity improvement.

Suitable means of metering the amendment into the flocculated manure stream may include a metering screw or auger as recited previously, a pneumatic blower, a metering conveyor, or other similar device. The upstream controls of the applicant's NTP systems 100 and 101 provide a steady flow rate and consistency of the flocculated manure stream. The amendment metering equipment may be set to match the manure flow through feed pipe 113 to achieve the desired proportion of amendment in the manure sludge 8.

During the composting cycle the repeated cycling of the bladders beneath the manure cake promotes the aeration of the sludge 8, which is beneficial to efficient aerobic aeration. The introduction of the ventilation air ensures the availability of oxygen for the aerobic bacteria, and also serves as a control mechanism for temperature to permit cooling the sludge 8; and alternately, by reducing the air flow, to permit the temperature to rise for stimulation of the bacteria in the sludge 8.

An improved box filter which has a filter medium that is longer lasting and easier for operating personnel to use, and which can be used with the applicant's waste manure treatment method and apparatus will now be described. It is first noted that the operation of the box filter 160 described herein and shown in FIG. 5 includes the installation of a large filter cloth 268 having various tucks as needed to form a box-shaped bag, which is folded up on to the rear door of the box to provide filtration at the door portion 267 of the filter 160 and to close off the rear of the filter bag. The filter cloth 268 of the box filter 160 has generally been a one-use disposable item in applications of the box filter 160. However, the performance of the chemistry in the applicant's NTP system allows for reuse of the filter cloths, as the cloths are not typically blinded by the manure solids after several uses. In order to reuse the standard filter cloth 268 of the filter 160 of FIG. 5, the cloth 268 must be folded up at the rear door by operating personnel for each repeated use. This is an unacceptable procedure from a health and safety perspective. In order to accommodate the repeated reuse of the filter cloths, a means to avoid or minimize personnel contact with the fabric at the rear door is necessary.

Figure 8B:
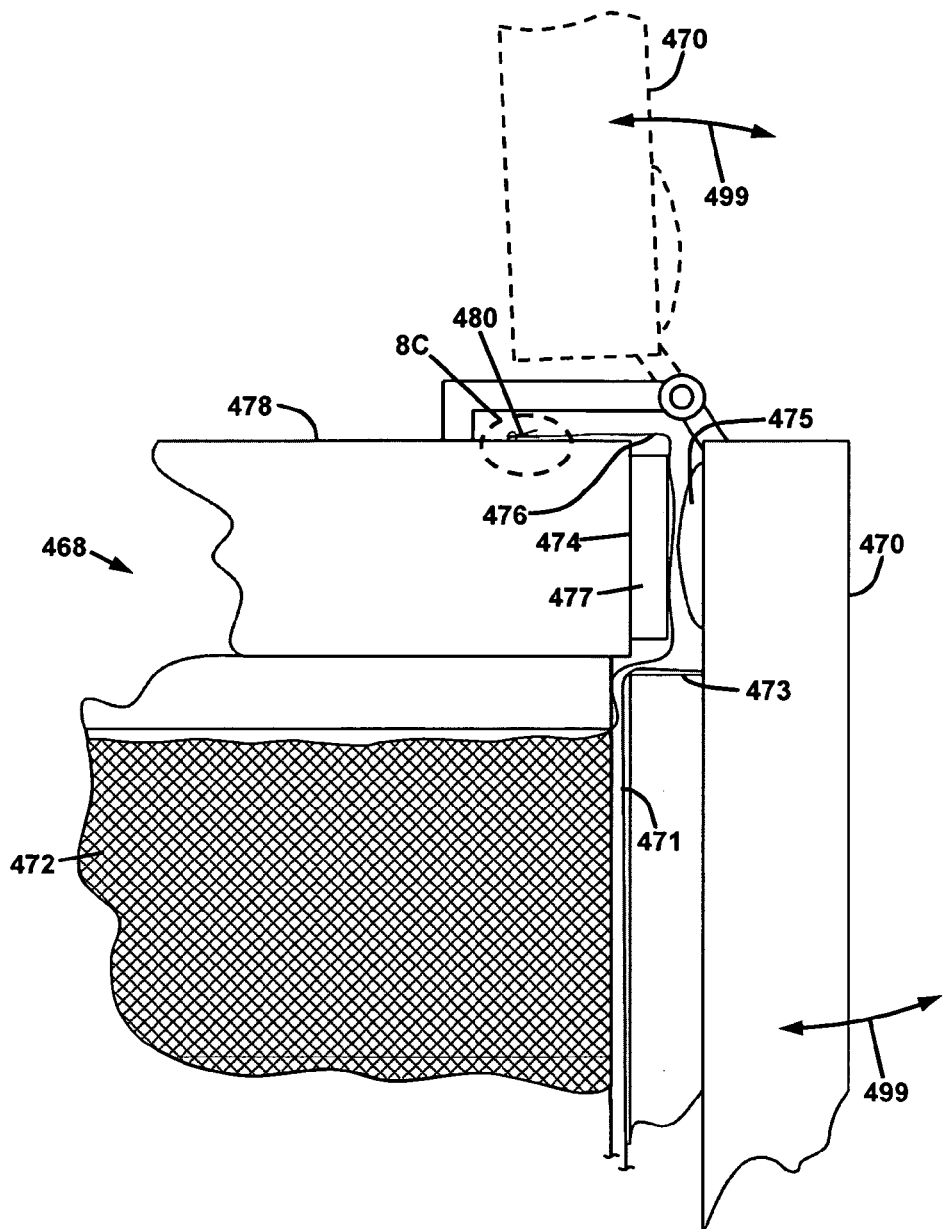
FIG. 8B is a detailed cross-section of the juncture of a side wall and a side door of the box filter of FIG. 8A, the detail showing the corner portion of the filter taken along the line 8B-8B in FIG. 8A.
Figure 8C:
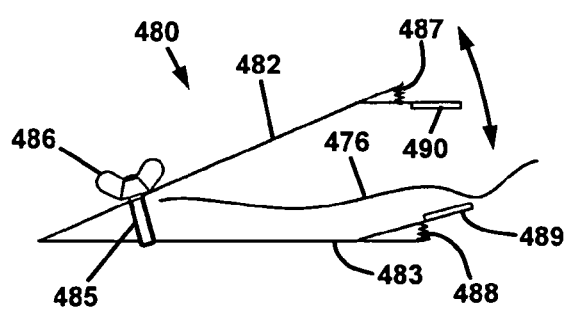
FIG. 8C is a view of a means for fastening the filter medium to the side wall of the filter, the detail showing the fastening means within the ellipse marked "8C" in FIG. 8B.

To meet this need, the applicant has invented an improved box filter with a filter medium that can be repeatedly reused, and easily refitted within the filter housing after the emptying of sludge or compost from the filter, as shown in FIGS. 8A-8C. FIG. 8A is a schematic cross-sectional illustration of a "box" type filter with improved filter media. FIG. 8B is a detailed cross-section of the juncture of a side wall and a side door of the box filter of FIG. 8A, the detail showing the corner portion of the filter taken along the line 8B-8B in FIG. 8A. FIG. 8C is a view of a means for fastening the filter medium to the vertical edges of the side wall of the filter, the detail showing the fastening means within the ellipse marked "8C" in FIG. 8B.

Referring first to FIG. 8A, box filter 460 is comprised of a box-shaped housing 462 having a bottom wall 464 and a surrounding side wall comprised of panels 466, 468, 470, and a fourth panel not shown. referring also to FIG. 8B, panel 470 of the surrounding side wall is configured as a door hingably attached to side wall 466, such that panel 470 can be deployed to an opened position by swinging to the side, and then closed again, as indicated by arcuate arrows 499 in FIG. 8B. Alternately the panel 470 may be hingably attached to the top of side wall 466 and its opposite panel (not shown) such that panel 470 can be upwardly deployed to an opened position, and then closed again.

Filter 460 is further comprised of a displaceable filter cloth 472 disposed within housing 462. The filter cloth 472 is made of a suitably durable and chemically resistant fabric such as e.g., woven or non woven polypropylene fabric. The four sided pocket-shaped filter cloth 472 is provided with a shorter than standard length at its end that is proximate to the door panel 470. The length is just sufficiently long to extend as a flap 492 a short distance beyond the vertical edge 474 of panel 468, and the corresponding opposite panel not shown; and beyond the horizontal edge of the bottom wall 464 that is contiguous with door panel 470 when the filter cloth 472 is properly installed and secured to the inside of the box-shaped housing 462. A suitable length for flap 492 is about 6 to 12 inches, although the distance may vary depending upon the construction of the filter box housing 462.

Along the side panel 468 and its opposite (not shown), this extra length or flap 476 of filter cloth 472 is wrapped around the ends and tethered to the exterior surfaces of the panels with suitable fastening means. Referring again to FIG. 8B, the flap 476 of filter cloth 472 extends outwardly and back along the outer surface 478 of panel 468. The flap 476 is secured to the outer surface 478 by suitable fastening means 480 such as that depicted in FIG. 8C. Referring to FIG. 8C, the fastening means is a clip 480 comprised of plates 482 and 484 adjustably secured to each other by threaded fastener 485 and nut 486. Clip 480 is further comprised of tension springs 487 and 488, and gripping pads 489 and 490. When nut 486 is tightened on fastener 485, the gripping pads 489 and 490 pinch flap 476 between them, thereby securing it to the vertical outer surface 478 of panel 468. It will be apparent that may other similar clips may be used in lieu of clip 480. Should flap 476 be of excessive length, the excess may be folded and tucked into clip 480 with further excess material left to drape outside of the clip and be cut off if necessary.

The door panel 470 is provided with a semi permanent flexible filter fabric 471 that is fastened to the "under drain system" (i.e. the filter cloth-supporting framework 473) at the rear door. This filter fabric is a suitably durable and chemically resistant fabric such as e.g., woven or non woven polypropylene fabric. The filter fabric is fastened to the under drain system 473 at the rear door 470, such as with bars (not shown) that pinch and seal off the edges of the fabric to the side walls of the filter box. A fabric manipulation mechanism such as a bladder as described herein may optionally be positioned behind the rear door filtration fabric 471 to ensure disruption of the filter cake on the fabric and keep the surface thereof from being blinded with sludge particles. This capability will also serve to knock off problematic manure cake when emptying the box filter 460.

Referring again to FIG. 8B, the surfaces of the door panel 470 which are contiguous with the vertical edges of the side walls 468 and its opposite and bottom wall 464 are fitted with a flexible gasket 475 which is compressed when the door 470 is closed and properly latched to form a water tight seal. The sealing surfaces of the side walls 468 and its opposite and bottom wall 464 may be fitted with a gasket 477 similar to the gasket 475 on the rear door. When there surfaces are compressed together by the closing of the door panel with the fabric of filter cloth 472 captured between them, they form a water tight seal and further secure the filter cloth within the box housing 462. It is noted that for simplicity of illustration, the gaskets 475 and 477 are not shown as being crushed into each other and pinching the flap 476 of filter fabric 472 in FIG. 8B, but such gaskets are crushed together when the door 470 is fully closed.

In the operation of filter 460, when the manure sludge has been dewatered and is ready for discharge from filter 460, the rear door 470 is opened as indicated by arrow 499 and the manure sludge is dumped from the box. The box filter 460 is preferably mounted as a "dump box" on a truck or other suitable elevating dumping structure, and is tiltable so that the bottom 464 of the box housing 462 is tilted downwardly towards door 470, so that the manure sludge simply falls out of the box housing 462. The filter cloth 472 remains tethered to the side lips of the box housing 462 and drapes across the bottom end when the charge of manure is emptied. The rear door 470 is then closed and latched, and the fabric is once again compressed between the rear door seal(s) 475 and 477 to form the water tight seal. This procedure may be repeated until the filter cloth 472 is no longer useable and requires replacement. At that time the fabric fastening means are released to allow for the removal of the filter cloth 472. The filter cloth 472 is then removed and replaced.

The applicant's methods and apparatus configurations described herein and shown in FIGS. 1-8C are advantageous with respect to several environmental considerations. Referring again to FIGS. 1 and 2, the supernatant liquid from the phase separation tank 150, the filtrate from active filter 160, and/or the filtrate from ultraclarification unit 180 may be collected, stored in gray water tank 170 or lagoon 175, and recycled. This filtrate water may be utilized as dilution water for the process or recirculated into the process at the rate required to achieve optimum chemical performance of the reagents A, B, and (optionally) C. This recirculation rate varies based upon the nature and concentration of the manure slurry.

The filtrate is also suitable for irrigation, fertilization and land spreading. The limiting nutrient remaining in the filtrate from the process for such use is typically the solubilized potash constituent and in some cases the nitrogen constituent. Typically this filtrate is acceptable for land application at five to ten times the normal application rate of raw manure, digested manure, or the filtrate from the mechanical separation of either. In many regions the increased application rate is due to the elimination of phosphorous as the limiting nutrient by the applicant's process; effluents containing phosphorous are typically subject to more stringent spreading limitations.

The nutrient, suspended solids and bacteria contaminant levels of the filtrate from the applicant's process disclosed herein are sufficiently low to allow for cost effective sterilization of this filtrate with commercial ozone treatment equipment. To the best of the applicant's knowledge, these low contaminant levels have not been previously achieved in a commercial manure treatment process, at least on a commercially economical basis.

The dewatered manure captured in the active filtration separation equipment contains organic nitrogen nutrient levels equivalent to a liquid manure mass two to three times larger. In addition, conventional manure dewatering systems capture the larger particulate matter and allow for passage of the finer organic matter into the filtrate, thus rendering the filtrate unsuitable for the above described uses. In addition, the land application of the liquid manure filtrate from the conventional manure dewatering, separation systems allow for the release of the inherent fine particulate as problematic sediment and nutrients to the proximate waterways. The applicant's process sequesters the significant majority if not all of the fine particulate as well as the phosphorous compounds and a significant portion of the organic nitrogen compounds with the solid phase dewatered manure mass which is land applied as a solid. This mitigates the release of the fine particulate matter and nutrients common to distribution of these materials in the conventional manure separator filtrate.

This characteristic of the dewatered manure solids is of particular benefit to centralized manure composting or digestion facilities. Conventional technologies allow for the transport of either all of the liquid manure as a slurry or only the dewatered manure solids from the distributed farms to the central processing site. The processing of all of the liquid manure as a slurry is generally not cost effective as the transportation cost and the system infrastructure requirements for such facilities have been shown to be cost prohibitive. The processing of only the dewatered manure provides for only treating approximately 50% of the total manure solids from any given farm. In addition, as mentioned above, these mechanically separated solids consist of the larger particulate and the finer organic matter is left at the farm in the separated filtrate. This finer organic matter contains more of the more readily digestible materials in manure digesters than the larger solids captured in mechanical separators.

The applicant's process provides for transportation of all of the digestible materials to the central site in approximately one third of the total volume of conventional liquid manure systems. In addition, it provides for delivery of the more digestible materials typically left behind at the distributed farms. The more readily digestible materials are understood to provide for higher yields of methane gas production within the digester.

The compost produced directly from the dewatered manure from the applicant's process or from digested manure utilizing the applicant's process prior to or post-digester contains higher nutrient levels than conventional compost due to the inherent retention of all of the solids and nutrients in the dewatered mass, as opposed to losing half of them in the filtrate of conventional mechanically separated manure, which is the source of the manure for conventional composting operations.

Additionally, the phosphorous compounds within the solid manure mass from the applicant's process are rendered insoluble by their reaction with the ferric chloride to produce ferric phosphate. While this characteristic depletes the value of the manure as a source of phosphate compounds for fertilization of croplands, it is a considerable benefit in environmentally sensitive areas. Certain watershed areas throughout the United States have phosphate levels sufficiently high that they severely negatively impact the downstream watershed basin by virtue of elevated levels of soluble phosphate. The ferric phosphate in the manure solids from the applicant's process is substantially insoluble, and therefore may become, at worst case, a portion of the insoluble sediment on the bottom of the watersheds streams, rivers and bays. Given appropriate regulatory approvals, farm operators may spread these treated manure solids on their phosphate overloaded lands in lieu of having to ship their manure to distant locations to meet the environmental regulations.

Similarly, the filtrate from the process is essentially free of any phosphate compounds and is significantly depleted of organic nitrogen compounds, as well as depleted of up to 50% of the dissolved ammonia compounds. As with the manure solids this characteristic depletes the fertilization value of this material. However, in environmentally sensitive areas the disposition of the liquid fraction of the manure may be a cost prohibitive expense to farmers. The nature of the filtrate from this process will typically allow for its utilization as irrigation water to the hydraulic limit of the lands proximate to the farm, which is generally multiple times greater than would be allowed given the nutrient loading limitation resulting from the use of prior art processes. This provides a significant cost savings to the farmer, even in light of the depleted fertilization value.

One additional significant benefit in the spreading of the filtrate from the applicant's process is the significant reduction of odor present in the filtrate. The agricultural community is under constant scrutiny for control of the odor of land applied manure. There are no methods known to the applicant which achieve the level of odor reduction exhibited by the applicant's process.

An Exemplary Design of an Apparatus of the Present Invention

The following description of aspects of one embodiment of the applicant's manure waste treatment apparatus is meant only to be exemplary and not limiting.

Referring to FIG. 2, one embodiment of the applicant's manure waste treatment apparatus was provided as follows:
Manure Source 102: A dairy operation producing about 30,000 gallons of liquid manure waste per day, which was collected in a pit.
Pump 105: A Model 3P682 pump manufactured by the Dayton Company, delivering a flow rate of liquid manure waste of about 30 gallons per minute.
Phase Separation Tank 150: The optimum tank configuration appears to be about 3.5 feet in diameter by about 10 feet high. The pitched, wide profile agitator blades are set at least 24 inches above the bottom of the tank, near the middle three foot level and near the six to eight foot level of the tank. The agitator speed varies with the nature of the solids within the manure slurry; however 20 to 30 rpm appears to be an optimum speed. The optimum flow rate for this configuration of tank appears to be in the range of 30 to 60 gallons per minute, and five to ten minutes, and in certain cases up to 20 minutes, appears to be the optimum residence time to achieve the separation of the clarified supernatant liquid phase from the thickened flocculated solid slurry phase.
Active Filter 160: A "Dry Box 15000" active filter manufactured and sold by Idee e Prodotti S.r.l. of Milan, Italy. Alternatively manufactured and sold by Innovative environmental Products of Livonia, N.Y. under license to Idee e Prodotti. The DryBox is preferably of the improved design which includes the supplemental air supply system for supplemental dewatering and the improved door seal configuration for safe multiple uses of the filter cloths.
Ultraclarification Unit 180: A "Squeeze Box" squeeze tower press manufactured and sold by Idee e Prodotti S.r.l. of Milan, Italy.
Gray Water Tank 170: A 1000 gallon polypropylene tank, flat bottom with a top and a high side outlet and low side outlet plus an overflow fitting. The filtrate enters the tank and is pumped away as needed to downstream disposition. Periodically the tank level may be manually raised to allow flow out of the high side outlet in order to flush out any floating solids that have accumulated over time. The lower side outlet is a least 6 inches above the bottom of the tank in order to avoid removal of any sediment that may accumulate over time. Alternately the filtrate may be stored in a lagoon or the excess water from the gray water tank may be sent to a lagoon.

It is, therefore, apparent that there has been provided, in accordance with the present invention, a method and apparatus for treating a liquid volume containing animal waste. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for treating a liquid containing waste manure, the method comprising:
   a. providing a treatment apparatus comprising at least a first vessel, and a filtration system in liquid communication with the first vessel, the filtration system comprising a first active filter including a first housing, a first displaceable filter medium, and a first displacement actuator disposed between the first housing and the first displaceable filter medium;
   b. delivering a portion of the liquid containing waste manure to the first vessel;
   c. adding a first reagent to the portion of liquid containing waste manure to cause the formation of waste manure flocs of a first size;
   d. adding a second reagent to the portion of liquid containing waste manure to cause growth of the waste manure flocs of the first size into separable waste manure flocs;
   e. separating the portion of liquid containing separable waste manure flocs within the filtration system into a waste manure sludge and a first filtrate; and
   f. dewatering the waste manure sludge by actuating said first displacement actuator to displace said first displaceable filter medium and producing a dewatered waste manure solid cake and a second filtrate wherein at least 85 weight percent of the organic nitrogen and at least about 97.5 weight percent of the phosphates and at least 94 weight percent of the total manure solids that were present in the portion of the liquid containing waste manure delivered to the first vessel is contained in the dewatered waste manure solid cake.

2. The method as recited in claim 1, wherein the first reagent is ferric chloride, and the second reagent includes a cationic polymer.

3. The method as recited in claim 2, further comprising adding a third reagent to the portion of liquid containing waste manure flocs to cause further growth of the separable waste manure flocs.

4. The method as recited in claim 3, wherein the third reagent includes an anionic polymer.

5. The method as recited in claim 1, wherein the first vessel is comprised of an elongated pipe through which flows the portion of the liquid containing waste manure, and wherein the first reagent is continuously injected into the elongated pipe.

6. The method as recited in claim 1, wherein the first vessel is comprised of a tank, the portion of the liquid containing waste manure is delivered to the tank as a batch, and wherein the first reagent is delivered to the tank and mixed with the portion of the liquid containing waste manure.

7. The method as recited in claim 1, wherein dewatering the waste manure sludge is performed by first manipulating the sludge by repeating the cycle of actuating the first displacement actuator and releasing the first displacement actuator for at least two cycles.

8. The method as recited in claim 1, wherein the filtration system is further comprised of a second filter in fluid communication with the first filter to receive the first and second filtrates, and the method further comprises further filtering the first and second filtrates with the second filter.

9. The method as recited in claim 8, wherein the second filter is comprised of a second housing, a second displaceable filter medium, and at least a second displacement actuator disposed between the second housing and the second displaceable filter medium.

10. The method as recited in claim 1, wherein separating the separable waste manure flocs within the filtration system into a waste manure sludge and a first filtrate and dewatering the waste manure sludge to produce a waste manure solid and a second filtrate is performed by delivering a first amount of the liquid containing separable waste manure flocs into the first filter, dewatering the sludge from the first amount of liquid by actuating the first displacement actuator, and then delivering a second amount of the liquid containing separable waste manure flocs into the first filter, and dewatering the sludge from the second amount of liquid by actuating the first displacement actuator.

11. The method as recited in claim 1, further comprising handling the separable waste flocs at sufficiently low shear rates to prevent size reduction of the separable waste flocs.

12. The method as recited in claim 1, wherein the apparatus is further comprised of a phase separation tank, and wherein the method further comprises delivering the portion of liquid containing separable waste manure flocs to the phase separation tank, and separating the portion of liquid containing separable waste manure flocs into a stream of supernatant liquid and a stream of concentrated separable waste manure flocs.

13. The method as recited in claim 1, wherein the liquid containing waste manure includes sand, and wherein the method comprises removing at least a portion of the sand from the liquid before delivering the portion of the liquid containing waste manure to the first vessel.

14. The method as recited in claim 1, further comprising composting the dewatered waste manure solid cake within the first housing of the first filter by causing air to flow through the solid cake.

15. The method of claim 14, further comprising repeatedly cycling the first displacement actuator from an unactuated state to an actuated state during composting the dewatered waste manure solid cake.

16. The method as recited in claim 14, further comprising adding an amendment material to the portion of liquid containing separable waste manure flocs prior to separating the portion of liquid containing separable waste manure flocs within the filtration system into the waste manure sludge and the first filtrate, wherein the amendment material increases the porosity of the dewatered waste manure solid cake.

17. The method as recited in claim 1, further comprising adding an amendment material to the portion of liquid containing separable waste manure flocs prior to separating the portion of liquid containing separable waste manure flocs within the filtration system into the waste manure sludge and the first filtrate, wherein the amendment material increases the porosity of the dewatered waste manure solid cake.

18. The method of claim 1, wherein the phosphates in the dewatered waste manure solid cake are water insoluble phosphates.

19. The method of claim 1, wherein the organic nitrogen compounds in the dewatered waste manure solid cake are water insoluble organic nitrogen compounds.

20. The method of claim 1, wherein at least 99% of fecal matter present in the portion of the liquid containing waste manure delivered to the first vessel is contained in the dewatered waste manure solid.

21. A method for treating a liquid containing waste manure, the method comprising:
   a. providing a treatment apparatus comprising at least a first vessel, and a filtration system in liquid communication with the first vessel, the filtration system comprising a first active filter including a first housing, a first displaceable filter medium, and a first displacement actuator disposed between the first housing and the first displaceable filter medium;
   b. delivering a portion of the liquid containing waste manure to the first vessel;
   c. adding a first reagent to the portion of liquid containing waste manure to cause the formation of waste manure flocs of a first size;
   d. adding a second reagent to the portion of liquid containing waste manure to cause growth of the waste manure flocs of the first size into separable waste manure flocs;
   e. separating the portion of liquid containing separable waste manure flocs within the filtration system into a waste manure sludge and a first filtrate;
   f. dewatering the waste manure sludge by actuating said first displacement actuator to displace said first displaceable filter medium and producing a dewatered waste manure solid cake and a second filtrate; and
   q. composting the dewatered waste manure solid cake within the active filter by causing air to flow through the solid cake.

22. The method of claim 21, further comprising repeatedly cycling the first displacement actuator from an unactuated state to an actuated state during composting the dewatered waste manure solid cake.

23. The method of claim 21, further comprising adding an amendment material to the portion of liquid containing separable waste manure flocs prior to separating the portion of liquid containing separable waste manure flocs within the filtration system into the waste manure sludge and the first filtrate, wherein the amendment material increases the porosity of the dewatered waste manure solid cake.

24. The method of claim 21, wherein at least 85 weight percent of the organic nitrogen and at least about 97.5 weight percent of the phosphates and at least 94 weight percent of the total manure solids that were present in the portion of the liquid containing waste manure delivered to the first vessel is contained in the dewatered waste manure solid cake.

25. The method of claim 21, wherein at least 99% of fecal matter that was present in the portion of the liquid containing waste manure delivered to the first vessel is contained in the dewatered waste manure solid cake.

26. A method for treating a liquid containing waste manure, the method comprising:
   a. providing a treatment apparatus comprising at least a first vessel, and a filtration system in liquid communication with the first vessel, the filtration system comprising a first active filter including a first housing, a first displaceable filter medium, and a first displacement actuator disposed between the first housing and the first displaceable filter medium;
   b. delivering a portion of the liquid containing waste manure to the first vessel;

c. adding a first reagent to the portion of liquid containing waste manure to cause the formation of waste manure flocs of a first size;
d. adding a second reagent to the portion of liquid containing waste manure to cause growth of the waste manure flocs of the first size into separable waste manure flocs;
e. separating the portion of liquid containing separable waste manure flocs within the filtration system into a waste manure sludge and a first filtrate;
f. dewatering the waste manure sludge by actuating said first displacement actuator to displace said first displaceable filter medium and producing a dewatered waste manure solid and a second filtrate; and
g. adding an amendment material to the portion of liquid containing separable waste manure flocs prior to separating the portion of liquid containing separable waste manure flocs within the filtration system into the waste manure sludge and the first filtrate, wherein the amendment material increases the porosity of the dewatered waste manure solid.

* * * * *